(12) United States Patent
Jeong et al.

(10) Patent No.: US 9,223,414 B2
(45) Date of Patent: Dec. 29, 2015

(54) METHOD AND APPARATUS FOR PROVIDING MOUSE FUNCTION USING TOUCH DEVICE

(71) Applicant: Samsung Electronics Co., Ltd., Gyeonggi-do (KR)

(72) Inventors: Seoghee Jeong, Gyeonggi-do (KR); Minkyung Lim, Gyeonggi-do (KR); Hongju Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 41 days.

(21) Appl. No.: 14/149,093

(22) Filed: Jan. 7, 2014

(65) Prior Publication Data
US 2014/0191960 A1    Jul. 10, 2014

(30) Foreign Application Priority Data

Jan. 7, 2013  (KR) .................. 10-2013-0001835

(51) Int. Cl.
*G06F 3/045*    (2006.01)
*G06F 3/041*    (2006.01)
*G06F 3/033*    (2013.01)
*G06F 3/0488*   (2013.01)

(52) U.S. Cl.
CPC ................. *G06F 3/033* (2013.01); *G06F 3/041* (2013.01); *G06F 3/0488* (2013.01)

(58) Field of Classification Search
CPC .. A63F 13/00; H04N 21/485; H04N 21/4122; H04N 21/4781; H04N 21/41407; G08C 2201/30; G08C 17/00; G06F 2203/04803; G06F 3/0488; G06F 3/1454; G06F 3/04847

USPC .......... 345/156, 169, 173; 715/221, 222, 226, 715/235, 236, 238, 239, 243, 249, 773, 864, 715/740; 709/203, 217, 227, 219, 204, 213
See application file for complete search history.

(56) References Cited

U.S. PATENT DOCUMENTS

| | | | |
|---|---|---|---|
| 8,560,976 B1* | 10/2013 | Kim ............................. | 715/863 |
| 2005/0264538 A1* | 12/2005 | Yeh ............................. | 345/173 |
| 2009/0146860 A1* | 6/2009 | Kwon .......................... | 341/176 |
| 2009/0322687 A1 | 12/2009 | Duncan et al. | |
| 2010/0214218 A1 | 8/2010 | Vaisanen et al. | |
| 2011/0093822 A1 | 4/2011 | Sherwani | |
| 2013/0232437 A1* | 9/2013 | Kim ............................. | 715/773 |
| 2014/0145955 A1* | 5/2014 | Gomez et al. ................ | 345/163 |
| 2015/0026649 A1* | 1/2015 | Zhao et al. ................... | 715/863 |

FOREIGN PATENT DOCUMENTS

WO   2005/064439 A2   7/2005
WO   2012/065885 A1   5/2012

* cited by examiner

*Primary Examiner* — Kent Chang
*Assistant Examiner* — Nelson Rosario
(74) *Attorney, Agent, or Firm* — Cha & Reiter, LLC.

(57) ABSTRACT

A method and apparatus of providing a mouse function in a touch device includes displaying a mouse interface which is divided into a panning area and a pointer move area. An input of a mouse gesture is received through the mouse interface, processing a panning operation of a contents screen which is displayed in a display device when the mouse gesture is inputted in the panning area, and processing a move operation of a mouse pointer which is displayed in the display device when the mouse gesture is inputted in the pointer move area. The touch device at the time of execution of the mouse mode, and generates a control event for panning the contents screen and moving the mouse pointer according to a mouse gesture which is inputted from the panning area and the pointer move area may provide a mouse function for a display device.

22 Claims, 16 Drawing Sheets

METHOD AND APPARATUS FOR PROVIDING MOUSE FUNCTION USING TOUCH DEVICE

CLAIM OF PRIORITY

This application claims the benefit of priority under 35 U.S.C. §119(a) from a Korean patent application filed on Jan. 7, 2013 in the Korean Intellectual Property Office and assigned Serial No. 10-2013-0001835, the entire disclosure of which is hereby incorporated by reference.

TECHNICAL FIELD

This disclosure relates to a method and apparatus for operating a mouse function using a touch device. More particularly, this disclosure relates to a method and apparatus for operating a mouse function using a touch device capable of eliminating inconvenience associated with the use of a mouse function in an existing touch device and providing improved usability.

BACKGROUND

Along with recent developments of digital technologies, various electronic devices capable of communicating and processing personal information while the electronic device is in motion, such as a mobile communication terminal, a personal digital assistant (PDA), an electronic organizer, a smart phone, and a tablet personal computer (PC) have been introduced. Such electronic devices, due to their portability, often do not remain in traditional areas of many other electronic devices, but are reaching a mobile convergence phase that covers areas of other terminals.

For example, a user device may include various functions such as a calling function including a voice call and a video call, a message transmission and reception function including a short message service (SMS)/multimedia message service (MMS) and an e-mail, a navigation function, a photographing function, a broadcast replay function, a media (moving image and music) replay function, an Internet function, a messenger function, and a social network service (SNS) function.

Moreover, recently, a function of easily viewing high-definition contents by connecting a portable terminal to an external display device (e.g., a TV and a monitor) and a high-definition multimedia interface (HDMI) has been achieved. At this time, a user typically would not frequently operate a personal computer from a remote place to view contents (e.g., movie contents, photo contents, game contents, and Internet contents). However, when trying to view various contents by connecting a portable terminal to a display device, a remote control device capable of convenient operation from a remote place is essential. In this regard, a remote operation using a wireless mouse and a wireless keyboard has been supported, but there is a need for a separate wireless mouse or wireless keyboard, and it is very inconvenient when trying to perform such an operation on a sofa in a living room, etc.

As such, a method of using a touch screen of a portable terminal held by user like a mouse pad has been suggested. However, such a conventional art provides only a mouse pad area and mouse right/left buttons as in a touch pad, the mouse pad area is used only for the movement of the mouse cursor, and the mouse right/left buttons are being used as selection/menu.

Hence, when operating the mouse function using the conventional portable terminal, for example, when trying to perform a drag & drop, the user needs to touch a mouse pad area, move the mouse cursor to a desired position, move the moved cursor to a position desired to be dropped by touching the mouse pad area in a state where the left button is inputted, and then perform a complicated operation of detaching a hand from the left button. This inconvenience may be felt in the mouse pad mounted on a notebook computer. Further, in the conventional portable terminal, a right/left screen flick or up/down scroll operation is convenient, and the operation is very inconvenient at the panning operation of moving the screen in the browser or gallery.

SUMMARY

The disclosure has been made in view of at least some of the above problems and to provide advantages discussed herein below. The disclosure provides a method and apparatus for a mouse function in a touch device, which can support an effective and functional mouse operation using electronic devices including a touch device.

The disclosure may further provide a method and apparatus for a mouse function in an electronic device including a touch device, which may resolve inconvenience of a mouse operation with existing touch devices and provide for improved usability by supporting a mouse function in a touch device.

The disclosure may further provide a method and apparatus for a mouse function in an electronic device including a touch device, which may improve convenience on a mouse function operation by dividing a panning area for panning control of the screen and a point movement area for pointer movement control of a mouse pointer through a screen division.

The disclosure may further provide a method and apparatus for a mouse function in an electronic device including a touch device, which may improve convenience of user and usability of a touch device by implementing optimal environments for supporting a mouse function in a touch device.

In accordance with an exemplary non-limiting aspect of the present disclosure, a method of providing a mouse function in a touch device includes: displaying a mouse interface which is divided into a panning area and a pointer move area; receiving an input of a mouse gesture through the mouse interface; processing a panning operation of a contents screen which is displayed in a display device when the mouse gesture is inputted in the panning area; and processing a move operation of a mouse pointer which is displayed in the display device when the mouse gesture is inputted in the pointer move area.

In accordance with another non-limiting exemplary aspect of the present disclosure, there is provided a computer-readable recording medium on which a program for executing the method in a processor is recorded.

In accordance with another non-limiting exemplary aspect of the present invention, a touch device includes: a display unit that displays a mouse interface which is divided into a panning area for panning of a contents screen and a pointer move area for movement of a mouse pointer at a mouse mode; a touch sensing unit that receives a touch event input from the panning area and the pointer move area of the mouse interface; a wireless communication unit that transmits a touch event generated from the mouse interface; and a controller that is configured to control a display of the mouse interface which is divided into the panning area and the pointer move area at the time of execution of the mouse mode, and generates a control event for panning the contents screen and moving the mouse pointer according to a mouse gesture which is inputted from the panning area and the pointer move area.

In accordance with another non-limiting exemplary aspect of the present invention, a remote control system using a mouse function includes: a master device that displays a mouse interface which is screen-divided into a panning area and a pointer move area when a mouse mode is executed, and generates a control event for panning of a contents screen and movement of a mouse pointer according to a mouse gesture which is inputted from the panning area and the pointer move area; a slave device that provides contents, and processes panning of a contents screen and movement of the mouse pointer according to a control event of the master device; and a display device that displays a screen related to the contents of the slave device.

In accordance with another non-limiting exemplary aspect of the present invention, a computer-readable recording medium has recorded a program which when executed by hardware such as a processor, microprocessor, or CPU configures the hardware for displaying a mouse interface which is divided into a panning area for panning of a contents screen and a point move area for movement of a mouse pointer in a mouse mode, and generating a control event for panning the contents screen and moving the mouse pointer according to a mouse gesture which is inputted from the panning area and the pointer move area.

BRIEF DESCRIPTION OF THE DRAWINGS

The above features and advantages of the present invention will become more apparent to a person of ordinary skill in the art from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring an artisan's appreciation of the subject matter of the present invention with such well-known functions and detail.

In a method and apparatus for providing a mouse function in a touch device allows for an easier use of a mouse function is provided using a touch device such as a smart phone held by user, and removes inconvenience associated with a mouse function in the existing touch device and provides improved usability.

According to an exemplary embodiment of the present invention, a mouse interface is displayed in a touch device, and a remote device may be controlled by a mouse function support according to a user's mouse gesture which is input based on the mouse interface. In particular, according to an exemplary embodiment of the present invention, the mouse interface provides at least two divided areas of the touch device for distinguished function control, such as a panning area for screen panning control of contents and a pointer move area for mouse pointer (or mouse cursor) control.

In an exemplary embodiment of the present invention, the panning may indicate a function (operation) of moving a screen (e.g., a vertical and horizontal movement, a screen conversion, navigation, scroll, etc.) according to a mouse gesture input to the mouse interface (particularly, the panning area) of the touch device by user. The contents may include movie contents, photo contents, game contents, Internet contents, etc.

Figure 1:
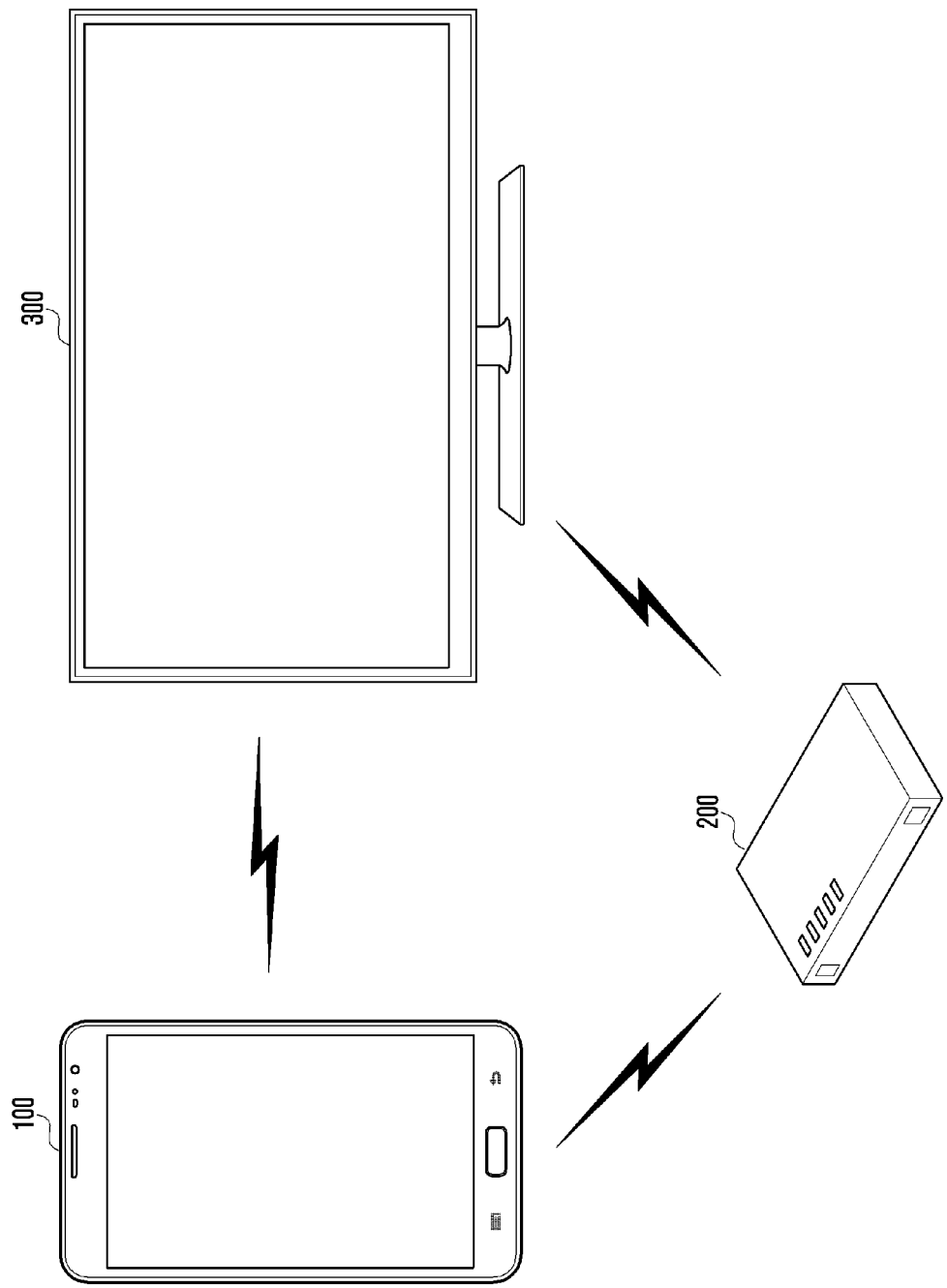
FIG. 1 schematically illustrates a configuration of a system that operates a mouse function according to an exemplary embodiment of the present invention.

FIG. 1 schematically illustrates a configuration of a system that operates a mouse function according to an exemplary embodiment of the present invention.

Referring now to FIG. 1, the system of the present invention includes a master device 100, a slave device, 200, and a display device 300, and supports a mouse function by a combination thereof, to be explained in more detail herein below.

The master device 100 is a typically a portable device carried by user, and may be a device that supports a screen display and a touch input by a touch screen. In particular, the master device 100 provides a screen interface for operation of a mouse function (hereinafter, referred to as "mouse interface") in the present invention, and generates events related with controlling a mouse-based function such as movement of a mouse pointer and panning operation based on the mouse interface. In other words, the master device 100 is an electronic device that displays the mouse interface in which the screen is divided into the panning area and the pointer move area at the time of executing the mouse mode, and generates a control event for panning of the content screen and the movement of the mouse pointer according to the mouse gesture inputted from the panning area and the pointer move area according to an exemplary embodiment of the present invention.

According to an exemplary embodiment of the present invention, the master device 100 may include all devices that use an application processor (AP), a graphic processing unit (GPU), and a central processing unit (CPU), such as all information communication devices, multimedia devices and application devices thereof which support the function of the present invention. For example, the master device 100 may include devices such as a tablet computer, personal computer, a smartphone, a portable multimedia player (PMP), a media player (e.g., an MP3 player), a portable game console, and a personal digital assistant (PDA) as well as mobile communication terminals operated according to each communication protocol corresponding to various communication systems. The configuration of the master device 100 of the present invention will be specifically described herein after with reference to FIG. 5.

The slave device 200 stores various contents that may be displayed through the display device 300. The slave device 200 may have a separate configuration of the master device 100 and the display device 300 as in the configuration of FIG. 1. Further, the functionality of the slave device 200 may be included in the master device 100, and in such a case, the configuration of the slave device 200 may be omitted. In addition, the slave device 200 may be mounted on the display device 300. In other words, in the present invention, the slave device 200 is a device that is connected through a wired interface or a wireless interface, transmits contents to the display device 300 through the connected interface, and displays the contents. Further, the slave device 200 may process panning and processing content displayed in the display device and movement of the mouse pointer according to the control event of the master device 100 in an exemplary embodiment of the present invention.

The slave device 200 according to an exemplary embodiment of the present invention may include all devices that use AP, GPU and CPU, such as all information communication devices, multimedia devices and application devices thereof, which support the function of the present invention. Further, the slave device 200 may further include hardware modules such as a digital camera, a storage medium (e.g., an external hard disk device), a personal computer, a notebook computer, etc. The configuration of the slave device 200 of the present invention will be specifically described herein after with reference to FIG. 6.

The display device 300 may be connected to the master device 100 or the slave device 200, and displays a screen corresponding to the contents provided from the connected master or slave device. In particular, the display device 300 may display a screen related with a mouse operation such as a screen conversion and show mouse pointer movement according to the mouse event generated in the mouse device 100 in a state where the screen for the contents is displayed. The display device 300 according to an exemplary embodiment of the present invention may include various devices for the screen display such as a monitor, a digital television, a digital signage (DS), and a large format display (LFD).

According to an exemplary embodiment of the present invention, in the above configuration shown in FIG. 1, the combination of the master device 100 and the display device 300 may be used, and the combination of the master device 100, the slave device 200, and the display device 300 may be used.

The operation by the master device 100 and the display device 300 will be described herein below.

In the case of the combination of the master device 100 and the display device 300, the operations may include one case where the master device 100 includes a role (e.g. functions as) of the slave device 200 and another case where the display device 300 includes a role (e.g. functions as) of the slave device 200, which shall be referred to as the respective former case and latter case.

In the former and latter cases of the previous paragraph, the master device 100 and the display device 300 may be connected through a wired interface (e.g., a high-definition multimedia interface (HDMI) (standard HDMI, mini HDMI, micro HDMI) and/or a universal serial bus (USB), etc.), or through the wireless interface (e.g., Wi-Fi, Bluetooth, 802.11, etc.).

In particular, in the former case, the master device 100 may transmit the contents stored in the master device 100 through the wireless interface to the display device 300 to be displayed. Further, the master device 100 may process the mouse function operation corresponding to the user's mouse control event using the mouse interface in a state where the contents are displayed through the display device 300.

In contrast, in the latter case, the display device 300 may be provided the contents from the built-in slave device 200 and display the screen. Further, the master device 100 is connected with the slave device 200 built into the display device 300 through a wireless interface, and may process the mouse function operation according to the user's mouse control event using the mouse interface.

The operation by the master device 100, the slave device 200, and the display device 300 will be further described herein below.

In the case of the combination of the master device 100, the slave device 200, and the display device 300, the master device 100 and the slave device 300 may be connected through the set wireless interface (e.g., Wi-Fi, Bluetooth, etc.), and the slave device 200 and the display device 300 may be connected through the wired interface (e.g., HDMI, USB, etc.). In other words, the master device 100 may transmit the user's mouse control event based on the mouse interface through communication with the slave device 200. The slave device 200 may receive the mouse control event through communication with the master device 100 and transmit the stored contents through communication with the display device 300.

For example, the slave device 200 and the display device 300 may be connected through the wired interface, and may display the contents stored in the slave device 200 in the display device 300. Further, the master device 100 and the slave device 300 may be connected through the wireless interface to remotely control the contents displayed in the display device 300.

Hereinafter, a case where the system of the present invention is operated as the configuration of the master device 100, the slave device 200, and the display device 300 will be described as a representative example. In other words, the master device 100 is operated as an input unit that provides the mouse interface and generates a mouse control event according thereto, the slave device 200 is operated as a processing unit that reflects the mouse function according to the mouse control event of the master device 100, and the display device 300 may be operated as a display unit that displays the contents provided from the slave device 200.

Figure 2:
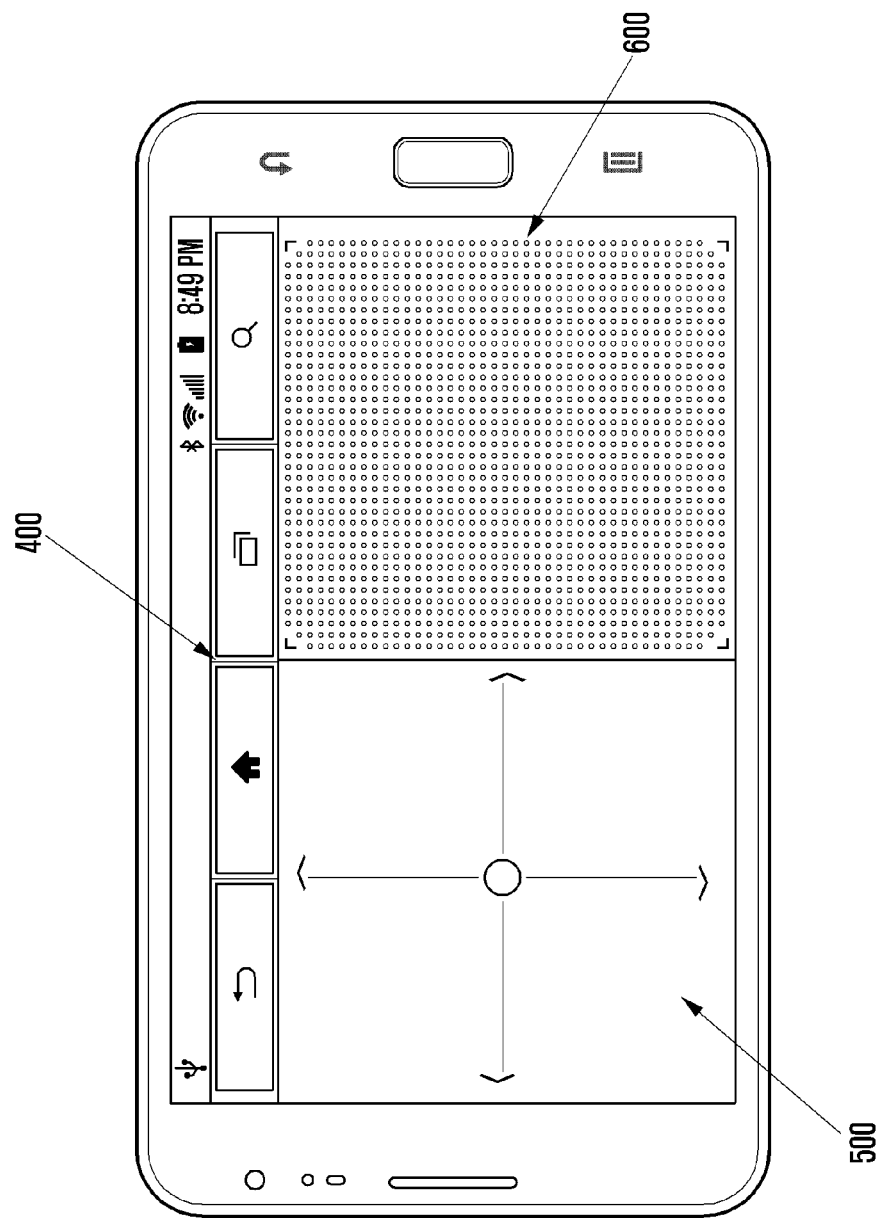
FIG. 2 illustrates an example of a screen interface that is provided for operation of a mouse function in a master device according to an exemplary embodiment of the present invention.
Figure 3:
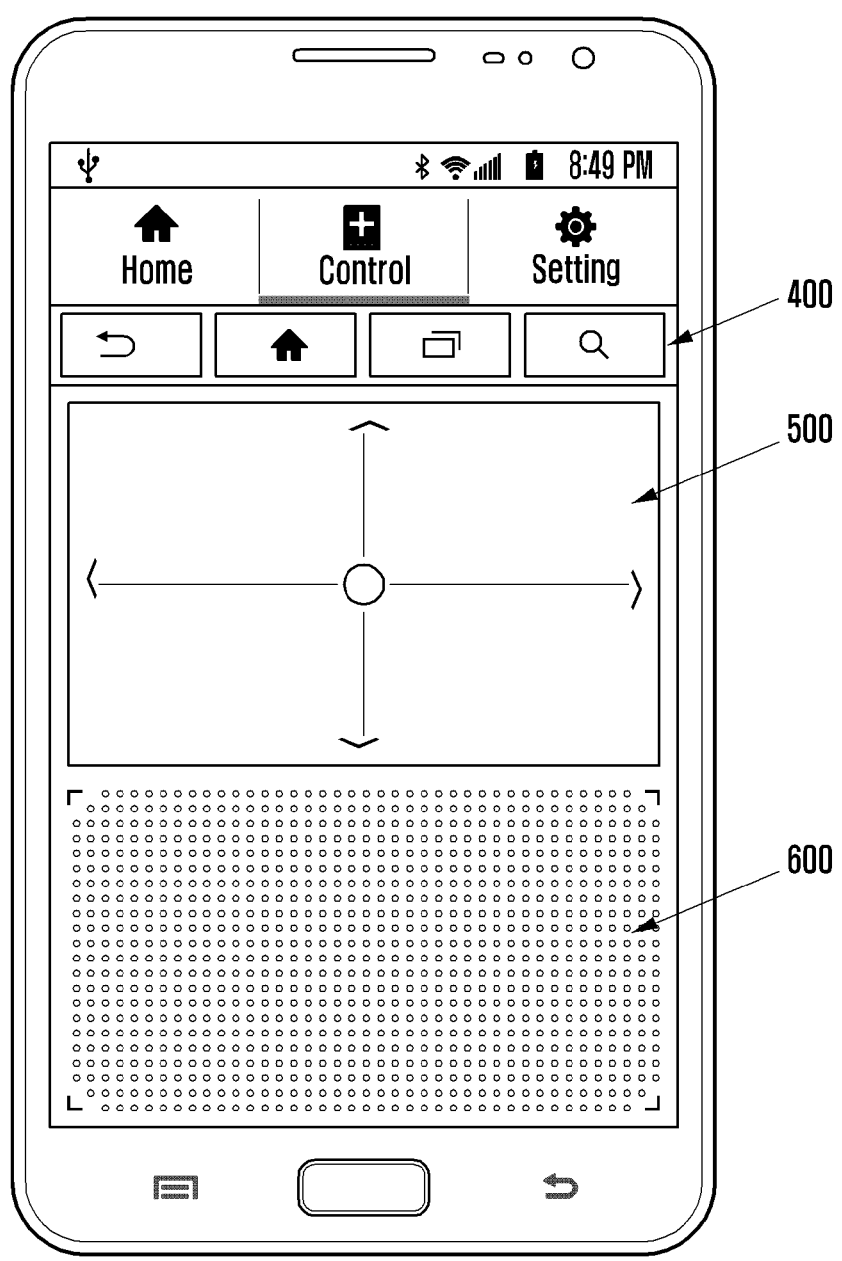
FIG. 3 illustrates an example of a screen interface in a vertical (portrait) mode.

FIGS. 2 and 3 illustrate an example of a screen interface that is provided for operation of a mouse function in a master device 100 according to an embodiment of the present invention. FIG. 2 is in a landscape or horizontal view, while FIG. 3 is in a portrait or vertical view.

Figure 4:
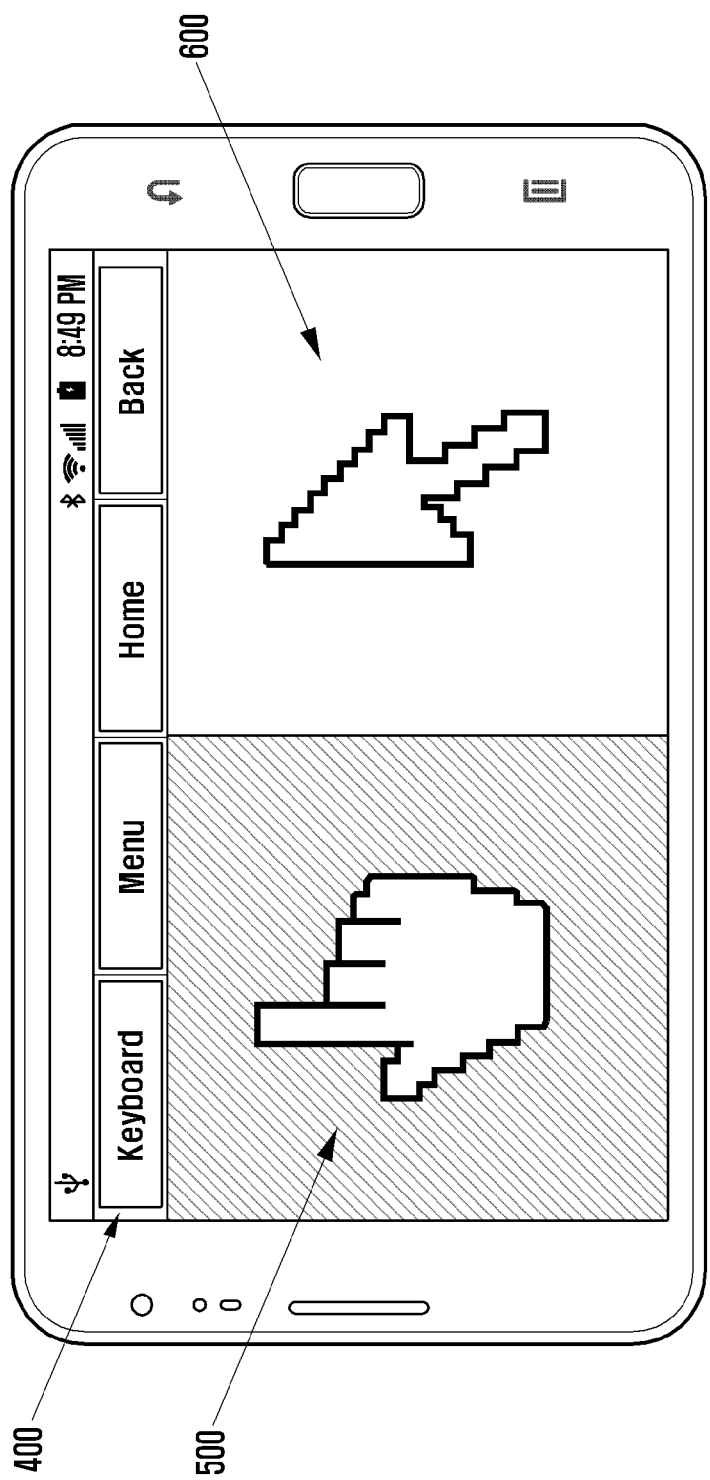
FIG. 4 illustrates additional examples of a screen interface provided for operation of a mouse function in a master device.

Referring to FIGS. 2, 3 and 4, the mouse interface according to an embodiment of the present invention may be implemented as having a function button area 400, a panning area 500, and a pointer move area 600. In particular, the mouse interface of the present invention may be implemented as a both a hand mouse control screen of a screen division type in which the panning area 500 is distinguished from the pointer move area 600. The location of the panning area 500 and the pointer move area 600 may be adaptively convertible according to the user's setting.

The mouse interface of the present invention may be adaptively converted into the mouse interface of the horizontal mode optimized for the horizontal (landscape) type and the mouse interface of the vertical mode optimized for the vertical (portrait) type as illustrated in FIGS. 2 and 3 according to the horizontal mode and the vertical mode of the master device 100. Further, the mouse interface supports the user's left hand mode and right hand mode, and may change the position of the right/left (or upper/lower) areas depending on the mode.

The function button area 400 is an area where a plurality of function shortcut buttons are provided according to user's setting. More particularly, the function button area 400 is an area where the user's mouse gesture input is received, and a touch event related with the function allocated to the shortcut button is generated according to the mouse gesture. For example, the function button area 400 is an area for execution of various functions such as Keyboard (virtual keypad), Menu, Home, Back, and Search which are allocated to a shortcut key button in response to the user's tab event.

The panning area 500 is an area where the user's mouse gesture input is received, and a touch event related with the panning of the screen of the contents displayed in the display device 300 is generated. For example, the panning area 500 is an area for function control such as pushing a left button of the mouse and controlling the screen movement in response to a touch event such as a touch down, a touch move, and a touch up. User may easily perform panning for various screens of the contents displayed in the display device 300 through the panning area 500, and may conveniently process the horizontal and vertical movement of the screen, the right/left screen conversion according to a flick event, the list scroll within the screen, the contents navigation, etc.

With continued reference to FIGS. 2 and 3, the pointer move area 600 is an area where the user's mouse gesture input is received and a touch event related with controlling the movement of the mouse pointer displayed in the display device 300 is generated. For example, the pointer move area 600 is an area for function control, such as when moving a mouse without pushing the left button of the mouse in response to a touch event such as a user's touch down, a touch-move, and a touch-up.

FIG. 4 illustrates yet another example of a screen interface provided for operation of a mouse function in a master device 100 according to an exemplary embodiment of the present invention.

Referring now to FIG. 4, the mouse interface of the present invention may be provided in various forms for user convenience, and the type of such a mouse interface may be changed depending on user's setting.

As illustrated in FIG. 4, the items (e.g., a finger-type icon, text, etc.), which indicates that the area having the icon is an area for the panning operation, may be displayed in the panning area in consideration of user's intuition, and items (e.g., an icon of a mouse pointer type, text) indicating that the area is an area for pointer movement may be displayed in the pointer move area 600.

Further, for the function button area 400, a certain icon may be provided as in FIGS. 2 and 3, or a text may be provided as in FIG. 4. Further, in the present invention, the display of the function button area 400 may be omitted in the mouse interface according to user's preference setting.

Hereinafter, the configuration of the device and the operation control method thereof according to an exemplary embodiment of the present invention will be described with reference to the drawings below. The configuration of the device and the operation control method thereof according an exemplary embodiment of the present invention is not limited to the description below, and may be applied to various other exemplary embodiments.

Figure 5:
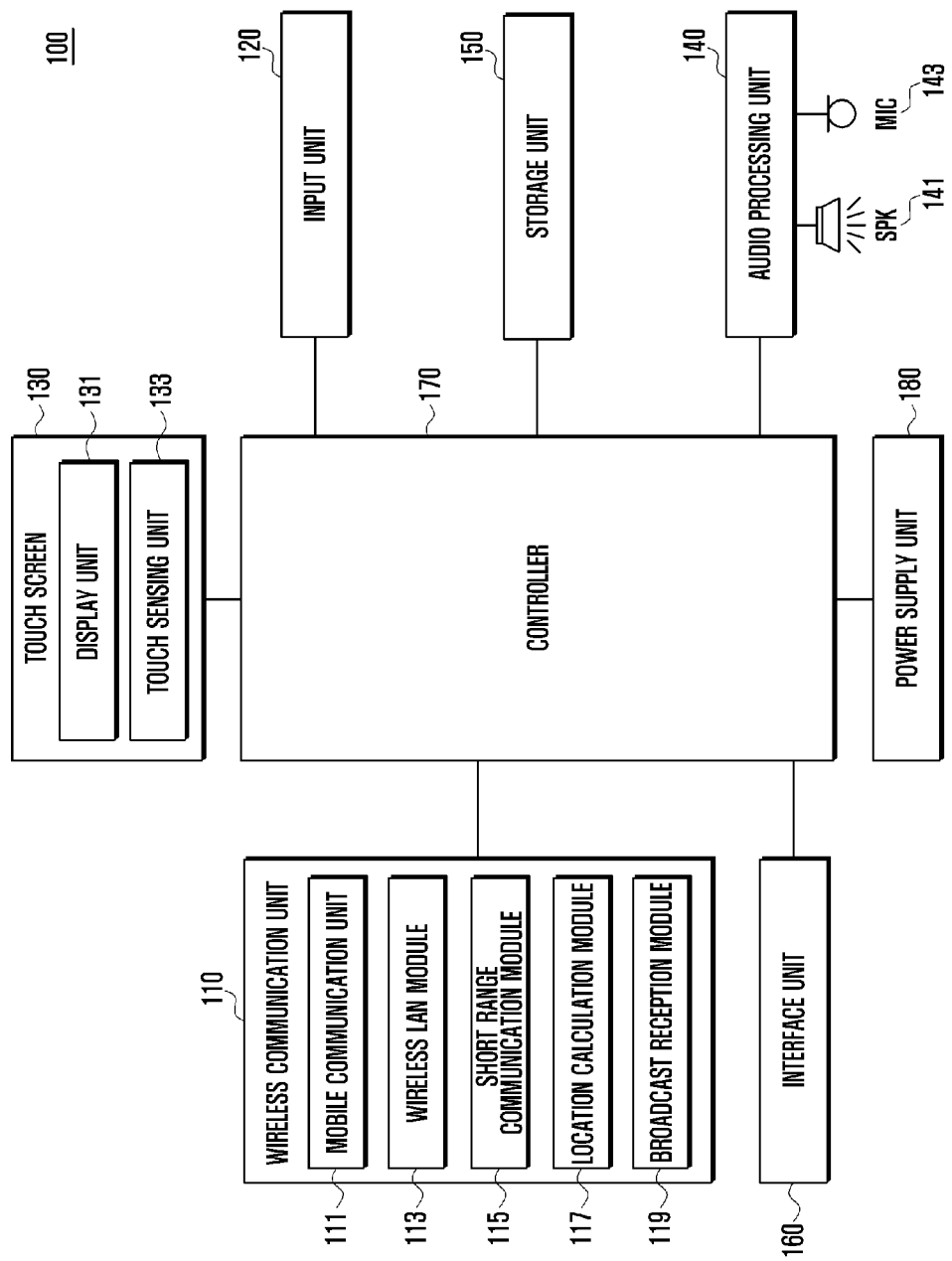
FIG. 5 schematically illustrates a configuration of a master device according to an exemplary embodiment of the present invention.

FIG. 5 schematically illustrates a configuration of a master device 100 according to an exemplary embodiment of the present invention. In particular, FIG. 5 illustrates a case where the master device 100 is a touch device that includes a touch screen.

Referring now to FIG. 5, the master device 100 of the present invention includes a wireless communication unit 110, an input unit 120, a touch screen 130, an audio processing unit 140, a storage unit 150, an interface unit 160, a controller 170, and a power supply unit 180. An artisan understands and appreciates that all of the aforementioned units constitute hardware under their broadest reasonable interpretation and contain circuitry that may or may not be integrated circuitry. The components of the master device 100 of the present invention, which are illustrated in FIG. 5, are not essential, and thus the master device 100 may be implemented to have more components or fewer components. For example, when the master device 100 according to an exemplary embodiment of the present invention supports a photographic function, the configuration of a camera module may be further included, and when the master device 100 according to an exemplary embodiment of the present invention does not support the mobile communication function, some components (e.g., a mobile communication module) of the wireless communication unit 110 may be omitted.

The wireless communication unit 110 may include one or more modules that allow wireless communication between the master device and the wireless communication system or between the master device 100 and another device. For example, the wireless communication unit 110 may include a mobile communication module 111 including a transmitter, receiver and/or transceiver, a wireless local area network (WLAN) module 113, a short range communication module 115, a location calculation module 117, and a broadcast reception module 119. In particular, the wireless communication unit 110 connects the master device 100 to the slave device 200, and transmits signals according to the mouse gesture (e.g., a touch event according to a touch-down, a touch-move, and a touch-up).

With continued reference to FIG. 5, the mobile communication module 111 transmits wireless signals to or receives the wireless signals from one of a base station, an external terminal, and various servers (e.g., an integration server, a provider server, a content server, etc.) on a mobile communication network. The wireless signal may include various forms of data according to transmission and reception of voice call signals, video call signals, or text/multimedia messages.

The wireless LAN module 113 provides a connection to wireless Internet and forming a wireless LAN link with another portable terminal, and may be internally or externally mounted on the master device 100. Some examples of the wireless Internet technologies are Wi-Fi, wireless broadband, and world interoperability for microwave access (Wimax, high speed downlink packet access. When the wireless LAN link is formed with another portable terminal, the wireless LAN module 113 may transmit or receive stored contents to or from another portable terminal according to a user's selection.

The short range communication module 115 represents a module for a short range communication. Some examples of the short range communication technology include but are no way limited to Bluetooth, Bluetooth low energy (BLE), radio frequency identification (RFID), infrared data association (IrDA), ultra wideband (UWB), ZigBee, near field communication (NFC), etc. The short range communication module 115 may transmit or receive contents according to the user's selection to or from another portable terminal when a short range communication is connected with another portable terminal.

The location calculation module 117 is a module for obtaining the location of the master device 100, and a representative example of the location calculation module 117 is a global positioning system (GPS). The location calculation module 117 may calculate the three-dimensional current location information according to latitude, longitude, and altitude by calculating a distance information and a time information from three or more base stations and then applying trigonometry to the calculated information. Further, the location calculation module 117 may calculate the location information by continually receiving the current location of the master device 100 from three or more satellites in real time. The location information of the master device 100 may be obtained by various methods.

The broadcast reception module 119 receives broadcast signals (e.g., TV broadcast signals, radio broadcast signals, data broadcast signals, etc.) and/or information related with the broadcast (e.g., broadcast channel, broadcast program or information related with the broadcast service provider, etc.) from an external broadcast management server through a broadcast channel (e.g., a satellite channel, a ground wave channel, etc.).

The input unit 120 generates input data for operation control of the master device 100. The input unit 120 may be composed of a keypad, a dome switch, a touch pad (static voltage/static current), a jog wheel, a jog switch, etc. The input unit 120 may be implemented in an external button form of the master device 100, and some buttons may be implemented as a touch panel.

The touch screen 130 is an input/output unit for both an input function and a display function, and includes a display unit 131 and a touch sensing unit 133, and may have a touch controller. In particular, in the present invention, if a touch event for user's mouse function control by the touch sensing unit 133 is inputted while the mouse interface is displayed through the display unit 131, the touch screen 130 transmits the touch event input to the controller 170. Then, the controller 170 may generate a control event related with the mouse function in response to the touch event as described below.

The display unit 131 displays an output of information processed in the master device 100. For example, when the master device 100 is in a calling mode, the calling-related user interface (UI) or graphic user interface (GUI) is displayed. Further, the display unit 131 displays the photographed or/and received image or UI or GUI when the master device 100 is at a video call mode or a photographing mode. More particularly, the display unit 131 displays the mouse interface which has been screen-divided into a panning area 500 and a pointer move area 600 as described with reference to FIGS. 2 and 3. The display unit 131 may support the screen display by the horizontal mode along the rotational direction (disposed direction) of the master device 100, and the screen display by the vertical mode, and the screen conversion display according to a change between the horizontal mode and the vertical mode.

The display unit 131 may be comprised of at least one of a liquid crystal display, a thin film transistor (TFT) LCD, a light emitting diode (LED), an organic LED (OLED), an active matrix OLED (AMOLED), a flexible display, a bended display, and a 3D display. Some displays may be implemented as a transparent display composed of a transparent type or an optical transparent type so that an external side may be visible.

The touch sensing unit 133 may be placed on the display unit 131, a user's touch event input (e.g., a touch down, a touch move, a touch up, etc.) that contacts the surface of the touch screen 130 may be sensed. When user's touch event is sensed on the surface of the touch screen 130, the touch sensing unit 133 may detect the coordinates where the touch event has occurred, and transmit the detected coordinates to the controller 170. The touch sensing unit 133 senses a touch event input generated by user, and generates signals according to the sensed touch event and transmits the generated signals to the controller 170. As such, the controller 170 may perform a function corresponding to an area where a touch event has occurred by a signal transmitted in the touch sensing unit 133. In particular, the touch sensing unit 133 may receive a mouse gesture (e.g., a panning operation, a pointer move operation, etc.) for control of the mouse function through a mouse interface given at the mouse mode of the master device 100. The touch sensing unit 133 may be configured to convert changes of the pressure applied to a certain part of the display unit or capacitance generated in a certain part of the display unit 131 into electric input signals. The touch sensing unit 133 may be configured to detect pressure at the time of a touch as well as the location and area of the touch. When there is a touch input for the touch sensing unit 133, the corresponding signals are transmitted to the touch controller (not shown). The touch controller (not shown) processes the signals and transmits the corresponding data to the controller 170. As such, the controller 170 may understand which part of the display unit 130 has been touched. The touch sensing unit 133 also recognizes "near touch" where a finger or stylus does not have to make physical contact with the touch screen but instead comes within a predetermined distance from the touch screen.

The audio processing unit 140 transmits audio signals received from the controller 170 to the speaker (SPK) 141, and performs a function of transmitting audio signals such as voice received from the microphone (MIC) 143 to the controller 170. The audio processing unit 140 converts digital to analog voice/sound data into audible sounds through the speaker and output the converted sounds under control of the controller 170, and convert audio signals such as voice received from the microphone 143 into digital signals through hardware such as an analog to digital converter and transmits the digital signals to the controller 170.

With continued reference to FIG. 5, the speaker 141 may output audio data received from the wireless communication unit 110 in a mouse mode, a calling mode, a recording mode, a media content replay mode, a broadcast reception mode, a photographing mode, etc., or output audio data stored in the storage unit 150. The speaker 141 may output sound signals related with the function performed in the master device 100 (e.g., a call connection reception, a call connection transmission, a music file replay, a moving image file replay, photographing, an external output, etc.).

The microphone 143 receives external sound signals in a calling mode, a recording mode, a voice recognition mode, a photographing mode, etc., and processes the signals as electric sound data. At the calling mode, the processed voice data may be converted into a transmittable form to the mobile communication base station through the mobile communication module 111 and is then outputted. Further, various noise-removing algorithms for removing the noise generated in the process of receiving the external sound signals may be implemented.

The storage unit 150, which comprises non-transitory storage may store a program for processing and controlling of the controller 170, and may store a function for temporarily storing inputted/outputted data (e.g., a phone number, a message, media contents (e.g., a music file, a moving image file, an image file, etc.), an application, etc.). The use frequency according to function operation of the master device 100 (e.g., the application use frequency, media content replay frequency, and the use frequency on the phone number, the message and the multimedia, etc.), importance, priority, and preference may also be stored in the storage unit 150. Data on sounds and vibrations of various patterns outputted at the time of a touch input on the touch screen 130 may also be stored in the storage unit 150.

The storage unit 150 may include at least one of a flash memory type, a hard disk type, a micro type, a card type (e.g., a secure digital (SD) card or an extreme digital (XD) card, etc.) memory, a random access memory (RAM), a static RAM (SRAM), a read-only memory (ROM), a programmable ROM (PROM), an electrically erasable PROM (EEPROM), a magnetic RAM (MRAM), a magnetic disk, and an optical disk memory. The master device 100 may be operated in connection with the web storage that performs the storage function of the storage unit 150 in Internet.

The interface unit 160 works as a passage with all external devices connected to the master device 100. The interface unit 160 may receive data from the external device, be supplied power and transmit the power to each component of the master device, or transmit internal data of the master device 100 to an external device. For example, the interface unit 160 may include a wired/wireless headset port, an external charger port, a wired/wireless data port, a memory card port, a port that connects a device including an identification module, an audio input/output port, a video input/output port, and an earphone port. In particular, in the present invention, the interface unit 160 includes a data port to be connected to the slave device 200 and the display device 300, which are external devices, in a wired or a wireless manner. For example, the interface unit 160 may include a HDMI (standard HDMI, mini HDMI, micro HDMI) and/or USB interface for connecting the display device 300 with the master device 100. Further, when the master device 100 is connected to the display device 300 or the master device 100 is connected to the slave device 200 by wireless LAN (Wi-Fi), the wireless LAN may be included in the interface unit 160, and when the master device 100 is connected to the display device 300 or the master device 100 is connected to the slave device 200 by Bluetooth, the Bluetooth may be included in the interface unit 160.

The controller 170, which comprises circuitry that may be structured as an integrated circuit comprising at least a processor or microprocessor, is configured to control overall operation of the master device 100. For example, the controller 170 performs control related actions with a voice call, data communication, a video call, a mouse function, etc. The controller 170 may include a multimedia module (not shown) for processing operations related with a mouse function. In the present invention, the multimedia module (not shown) may be implemented within the controller 170, and/or may be implemented separately from the controller 170.

The controller 170 is configured to control a series of operations, such as shown in the algorithms of FIGS. 7, 8, 13, 14, 15 and 16 for supporting a mouse function according to an embodiment of the present invention. More particularly, the controller 170 controls a display of the panning area for panning of the contents screen which is distinguished from the pointer move area for movement of the mouse pointer on the mouse interface at the mouse mode. Further, the controller 170 controls the generation of a control event for panning of the contents screen and movement of the mouse pointer according to the mouse gesture inputted form the panning area and the pointer movement area. In other words, the controller 170 may process an operation related with the panning of the contents screen and the movement of the mouse pointer according to the mouse gesture based on the panning area, and process the operation related with the movement of the mouse pointer and the execution of the function according to the mouse gesture based on the pointer movement area.

Further, when detecting the mouse gesture in the panning area, the controller 170 checks the status of the pointer move area, and if the pointer move area is not in a touch press state, the panning of the contents screen and the movement of the mouse pointer may be controlled together according to the mouse gesture. At this time, after the panning of the contents screen and the movement of the mouse pointer according to the mouse gesture, when the mouse gesture is canceled, the controller 170 may control the moved mouse pointer to be returned to the original position before the movement. In contrast, if the pointer move area is in a touch press state, the controller 170 then controls only the panning of the contents screen according to the mouse gesture of the panning area, and controls the position of the mouse pointer to remain fixed while the contents screen is panned. The touch press state can be activated or deactivated by a function button 400 or by a gesture or voice command to the touch device 100.

The detailed control operation of the controller 170 will be described in the operation example of the master device 100 and the control method thereof with reference to the attached drawings.

The power supply unit 180 accepts external or internal power by control of the controller 170 and supplies power necessary for each component of the master device 100.

Further, various exemplary embodiments described in the present invention may be implemented within a non-transitory machine readable recording medium that may be readable by a computer or a device similar to a computer using software, hardware or a combination thereof. As the invention does not constitute software per se, the machine readable code is executed and loaded into a hardware such as a processor, micro-processor, or controller, all of which have hardware circuitry. According to hardware implementation, embodiments of the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, and electric units for performing other functions. In some cases, the embodiments described in the present specification may be implemented by the controller 170 itself. According to a software implementation in which the software is executed by hardware such as a processor, microprocessor or controller, the exemplary embodiments such as the procedure and function described in the present specification may be implemented as separate software modules. Each of the software modules when executed by hardware, such as a processor, microprocessor or controller having circuitry, and may perform one or more of the functions and operations described in the present specification.

Here, the non-transitory recording medium may include a computer-readable recording medium having recorded a program that when executed by hardware is configured to control the display of a mouse interface which is divided into a panning area for panning of a contents screen and a pointer move area for movement of a mouse pointer, and processes generation of a control event for screen panning of contents and movement of the mouse pointer based on the mouser gesture which is input from the panning area and the pointer move area.

Figure 6:
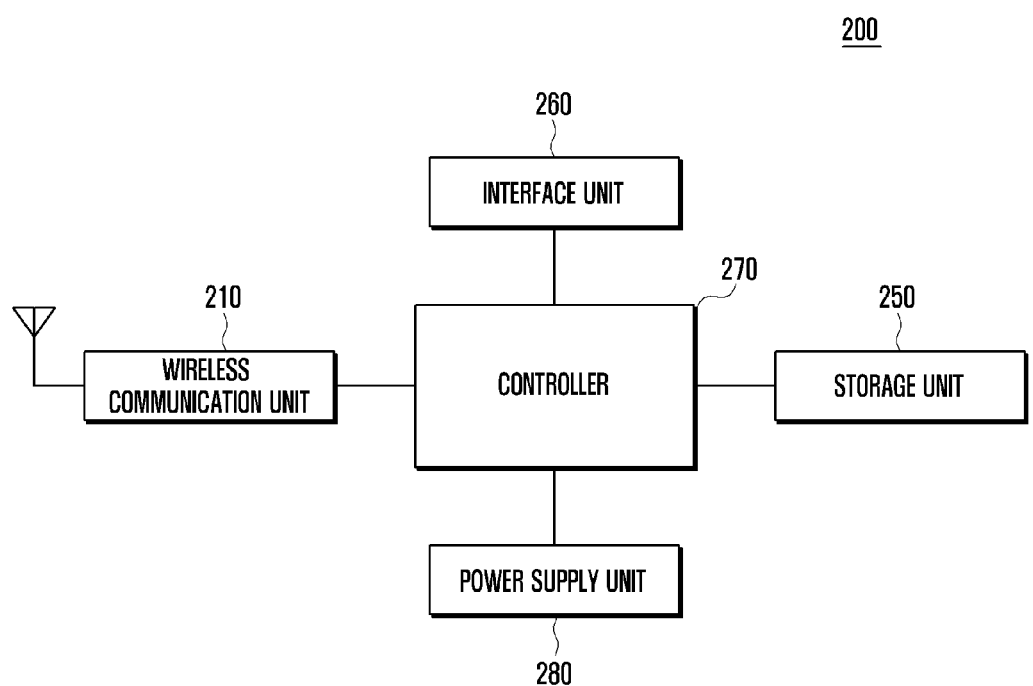
FIG. 6 schematically illustrates a configuration of a slave device according to an exemplary embodiment of the present invention.

FIG. 6 schematically illustrates a configuration of a slave device 200 according to an exemplary embodiment of the present invention.

Referring now to FIG. 6, the slave device 200 of the present invention may include a wireless communication unit 210, comprising hardware such as a transmitter, receiver, transceiver and coupled to one or more antennas, a non-transitory storage unit 250, an interface unit 260 comprising one or more integrated circuits configured for operation, a controller 270 comprising a processor, microprocessor, or controller, and a power supply unit 280 also comprising hardware to convert voltages from AC to DC, and to step up or step down the voltage for input as required for operation of other hardware components. The components of the slave device 200 illustrated in FIG. 6 are not essential, and thus the slave device 200 may be implemented to have more or fewer components.

The wireless communication unit 210 may include one or more modules which contain circuitry such as a processor, microprocessor or controller, or when loaded and executed by same configure the hardware to enable wireless communication between the slave device 200 and the master device 100. For example, the wireless communication unit 210 may include a wireless LAN module and a short range communication module. In particular, the wireless communication unit 210 connects the slave device 200 with the master device 100 through, for example, communication between a transceiver of each device, and receives signals according to a mouse gesture of the master device 100.

The storage unit 250 comprises a non-transitory memory and may store machine executable code for processing and control of the controller 270 (which would execute such code to be configured for operation), and may temporarily store inputted/outputted data (e.g., media contents such as a music file, a moving image file, and an image file, a list, etc.). The storage unit 250 may store the frequency of use (e.g., the frequency of use of the application, the frequency of replay of the media contents, etc.), importance, priority, and preference according to operation of the function of the slave device 200. The storage unit 250 includes at least one of a non-transitory memory of a flash memory type, a hard disk type, a micro type, a card type, etc., RAM, SRAM, ROM, PROM, EEPROM, MRAM, a magnetic disk, and an optical disk type memory, just to name a few non-limiting examples.

The interface unit 260 serves as a passage with all external devices connected to the slave device 200. The interface unit 260 includes hardware that may receive data transmitted from an external device, be supplied power and transmit the power to each component of the slave device 200, or transmit internal data of the slave device 200 to the external device. For example, a wired/wireless headset port, an external charger port, a wired/wireless data port, a memory card port, a port that connects a device including an identification module, an audio input/output port, a video input/output port, an earphone port, etc. are just a few non-limiting examples of the structure that may be included in the interface unit 260. In particular, in the present invention, the interface unit 260 includes a data port for wired or wireless connection with at least one display device 300 which is an external device. For example, the interface unit 260 may include the HDMI (standard HDMI, mini HDMI, micro HDMI) and/or USB interface for connecting the slave device 200 with the display device 300. Further, when the slave device 200 is connected to the display device 300 by Wi-Fi, the wireless LAN may be included in the interface unit 160, and when the slave device 200 is connected to the display device 300 by Bluetooth, the Bluetooth may be included in the interface unit 160.

The controller 270 includes circuitry configured to control overall operation of the slave device 200. For example, when the slave device 200 is connected to the display device 300, the contents stored in the slave device 200 are provided to the display device 300 so as to be displayed on a display screen. Further, when the slave device 200 is connected to the master device 100, the controller 270 may receive a control event according to a mouse gesture which is transmitted from the master device 100, process screen conversion of contents and movement of the mouse pointer based on the received control event, and process mouse control synchronization with the master device 100 for the process. The detailed control operation of the controller 270 will be described in the operation example and control method of the slave device 200 with reference to the attached drawings.

The power supply unit 280 receives internal and external power by control of the controller 270, and includes hardware that supplies power at levels that is necessary for operation of each component of the slave device 200. An artisan understands the structure and function of a power supply unit.

Figure 7:
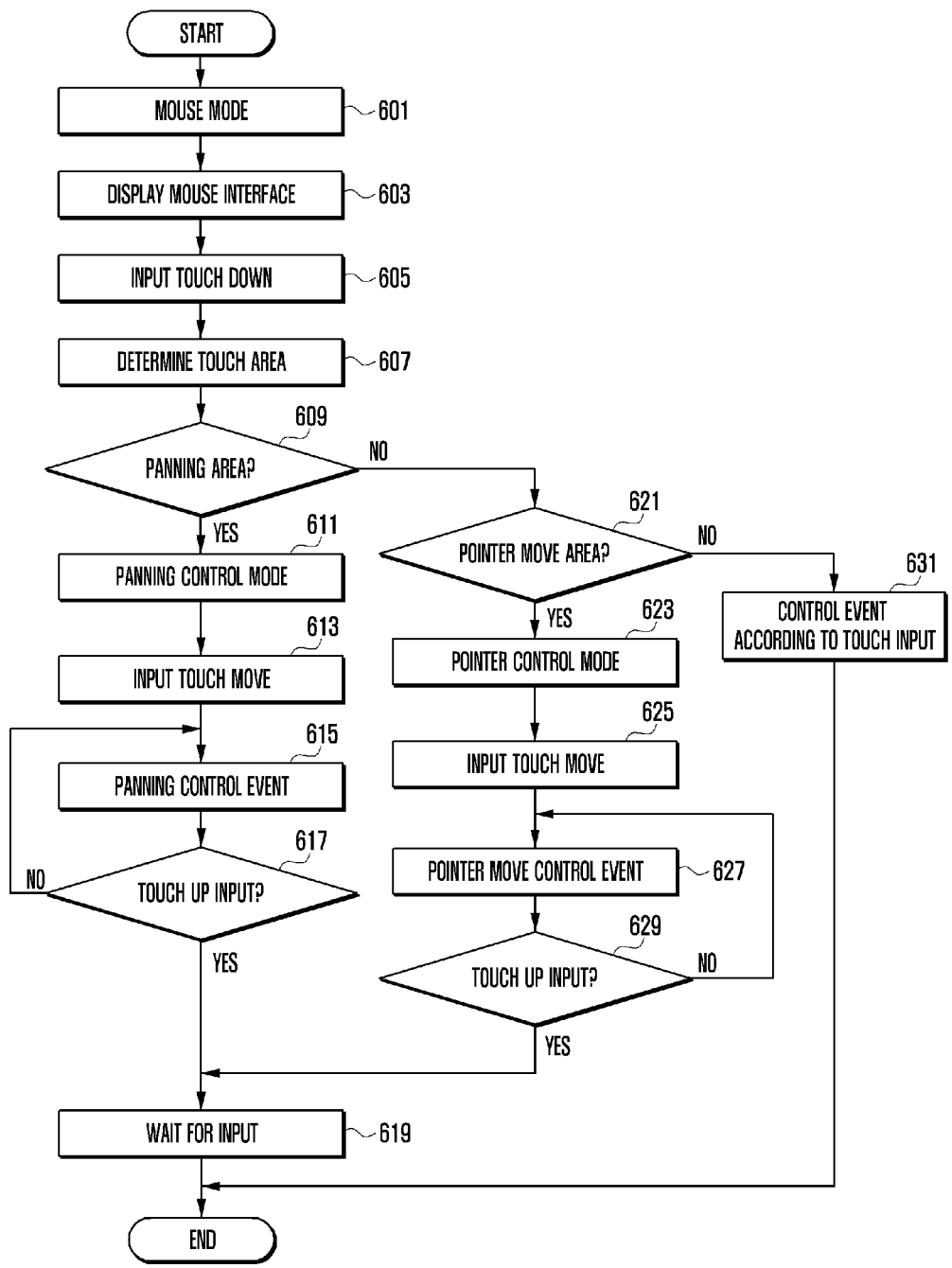
FIG. 7 is a flowchart illustrating a method of operating a mouse function in a master device according to an exemplary embodiment of the present invention.

FIG. 7 is a flowchart illustrating a method of operating a mouse function in a master device 100 according to an exemplary embodiment of the present invention.

Referring now to FIG. 7, at operation 601 the controller 170 executes mouse mode.

At operation 603, the controller 170 executes control of the display of the mouse interface. For example, if user requests execution of the mouse mode by the operation of the master device 100, the controller 170 can control the display the mouse interface, which has been divided, for example, into the panning area 500 and the pointer move area 600 (shown for example in at least FIGS. 2, 3, an 4) by executing the mouse mode, on the display unit 131, in response to the request. At this time, the controller 170 may execute the synchronization with the device (e.g., the slave device 200) of an object including contents to which the mouse function is applied. For example, the controller 170 may connect communication for remote control through the wireless interface (e.g., Wi-Fi) which is set between the master device 100 and the slave device 200, and perform the clock synchronization and frame synchronization for the process of the mouse gesture corresponding to the contents between the mater device 100 and the slave device 200.

At operation 605, in a state where the mouse interface is displayed, if a touch down is inputted on the mouse interface, then at operation 607 the controller 170 checks the touch area where the touch down has been inputted. For example, the touch down may indicate a touch event in which a certain object (e.g., a user's finger) is touched and pressed on a particular touch area of the mouse interface. More particularly, if a touch down is sensed, the controller 170 may distinguish whether the touch down has been inputted on the panning area 500 of the mouse interface or has been inputted in the pointer move area 600 by using coordinates where the touch has been inputted.

At operation 609, the controller 170 determines whether the touch down has been inputted in the panning area 500.

If at operation 609, it is determined that the touch down is inputted in the panning area 500 (Yes of operation 609), then at operation 611 the controller 170 activates the panning control mode.

Further, if at operation 613 the touch move is inputted in the panning control mode, then at operation 615 the panning control event is generated based on the touch move. In the present disclosure, the touch move may indicate a touch event in which the user's touched-down touch input is moved in a particular direction (e.g., up, down, right, left) in the panning area 500. For example, the controller 170 generates a control event for controlling the panning function that moves (e.g. shifts) a display of the contents screen, which is displayed through the display device 300 by connection of the slave device 200 with the display device 300, in upward, downward, right, and left directions.

At operation 617, the controller 170 may perform panning control according to the touch move until a touch up is inputted, and at operation 619 may terminate the panning control mode and wait for the next input if the touch up is inputted. In the present invention, the touch up may indicate a touch event that the user's touched-down touch input or the user's touch input according to the touch move is released on the mouse interface.

Referring back to operation 609, if the touch down is not inputted in the panning area 500, then at operation 621 the controller 170 determines whether the touch down has been inputted in the pointer move area 600.

If at operation 621, it is determined that the touch down has been inputted in the pointer move area 600 (Yes of operation 621), then at operation 623 the controller 170 activates the pointer control mode.

At operation 625 if a touch move is inputted in the pointer control move, then at operation 627 the controller 170 generates the pointer control event based on the touch move.

For example, the controller generates a control event for controlling the pointer movement that moves the mouse pointer on the contents screen that is displayed through the display device 300 by connection of the slave device 200 with the display device 300.

At operation 629, the controller 170 performs pointer movement control based on the touch move until a touch up is inputted, and when the touch up is inputted, then at operation 619 the controller 170 may terminate the control mode and wait for the next input.

At operation 631, if the touch down is not inputted in the panning area 500 and the pointer move area 600 (e.g. FIGS. 2, 3, and 4), the controller 170 generates a control event based on the touch input of the touch down. For example, if the touch down is inputted in a particular button of the function button area 400, the controller 170 generates the function control event corresponding to the particular button in which the touch down has been inputted.

Likewise, the controller 170 of the master device 100 may control the panning function or the pointer move function based on the area where the mouse gesture is inputted in the mouse interface. For example, when a mouse gesture such as a touch down, a touch move, and a touch up, is inputted in the panning area 500, events for screen movement control can include an operation of pushing the left button of the mouse and moving. Further, when a mouse gesture such as a touch down, a touch move, and a touch up is inputted in the pointer move area 600, an event for controlling pointer movement can include an operation of moving the mouse without pushing the left button of the mouse.

Figure 8:
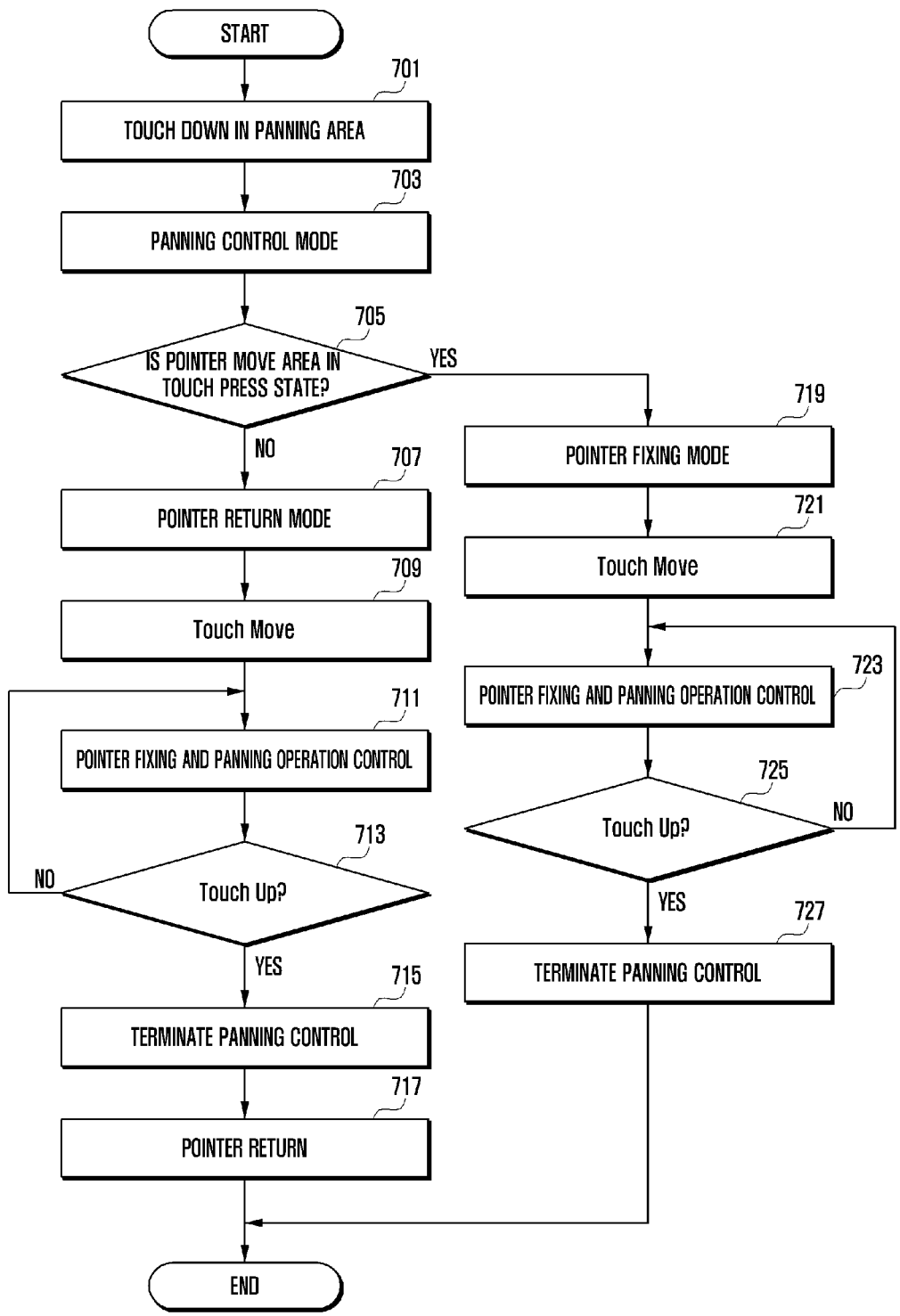
FIG. 8 is a flowchart illustrating a method of operating a panning function in a master device according to an exemplary embodiment of the present invention.

FIG. 8 is a flowchart illustrating a method of operating a panning function in a master device 100 according to an exemplary embodiment of the present invention.

Referring now to FIG. 8, at operation 701, if a touch down input is sensed in the panning area 500 of the mouse interface, then at operation 703 the panning control mode is activated, and at operation 705 it is determined whether a touch according to the pointer move area 600 is in a pressed state.

If at operation 705, another touch is not being pressed in the pointer move area 600 (No of operation 705), then at operation 707 the controller 170 determines control of the panning control mode (pointer return mode) by the pointer return. In the present disclosure, the return mode indicates the mode of panning the pointer movement of the mouse and the screen of contents at the time of panning operation, and automatically returning only the mouse pointer to the point where the first touch has been touched down when the panning is completed. Generally, at the panning operation, the mouse pointer is moved together. Hence, in order to perform continuous panning operation in a long list, etc., the mouse pointer may need to be moved to an intermediate point after one panning operation, and then the panning operation may need to be performed. Hence, in the present disclosure, when the panning operation is completed according to the touch up after the panning operation according to the touch move to resolve such inconvenience, the mouse pointer may be automatically returned to the initially touched down position, thereby enhancing user convenience.

If at operation 709, the touch move is inputted in the pointer return mode, then at operation 711 the controller controls pointer movement and panning operation of the mouse. For example, in a screen where the contents of the slave device 200 are displayed through the display device 300, a panning control event that moves the screen of the contents is generated along with the movement of the mouse pointer. The controller 170 performs panning control according to the touch move until the touch up is inputted at operation 713.

At operation 713, when a touch up is inputted, at operation 715 the controller 170 terminates the panning control mode, and generates a control event that at operation 717 automatically moves the mouse pointer moved according to the touch move to the initial position where the touch down has been inputted. In other words, when the panning is completed, the controller 170 may return the mouse pointer moved according to the panning to the initial position, and, at this time, the screen moved according to the panning maintains the moved state.

If at operation 705 another touch is being pressed in the pointer move area 600 (Yes of operation 705), then at operation 719 the control of the panning control mode (pointer fixing mode) by the pointer fixing is determined. In this disclosure, the pointer fixing mode represents a mode in which only the screen of contents is panned without moving the mouse pointer at the time of panning operation. Conventionally, the mouse pointer is moved together at the time of panning operation. Hence, in order to perform continuous panning operation in a long list, etc., one panning is performed, then the mouse pointer is moved to an intermediate point, and then the panning is inconveniently performed again. However, as explained in this disclosure, in order to resolve such inconvenience, when a touch is inputted through each of the panning area 500 and the pointer move area 600 in a different way (when a multi-touch is inputted), the user convenience may be improved by fixing the mouse pointer at the time of panning operation according to the touch movement of the panning area 500.

At operation 721, if a touch move is inputted in the pointer fixing mode, then at operation 723 the controller 170 fixes the mouse pointer at the current position and controls panning operation. For example, in a screen where the contents of the slave device 200 are displayed through the display device 300, the controller 170 fixes the mouse pointer at the current position, and generates a panning control event that moves only the screen of the contents. The controller 170 performs panning control at operation 723 according to the touch move until at operation 725 the touch up is inputted.

At operation 727, the controller 170 terminates the panning control mode when the touch up is inputted.

Figure 9:
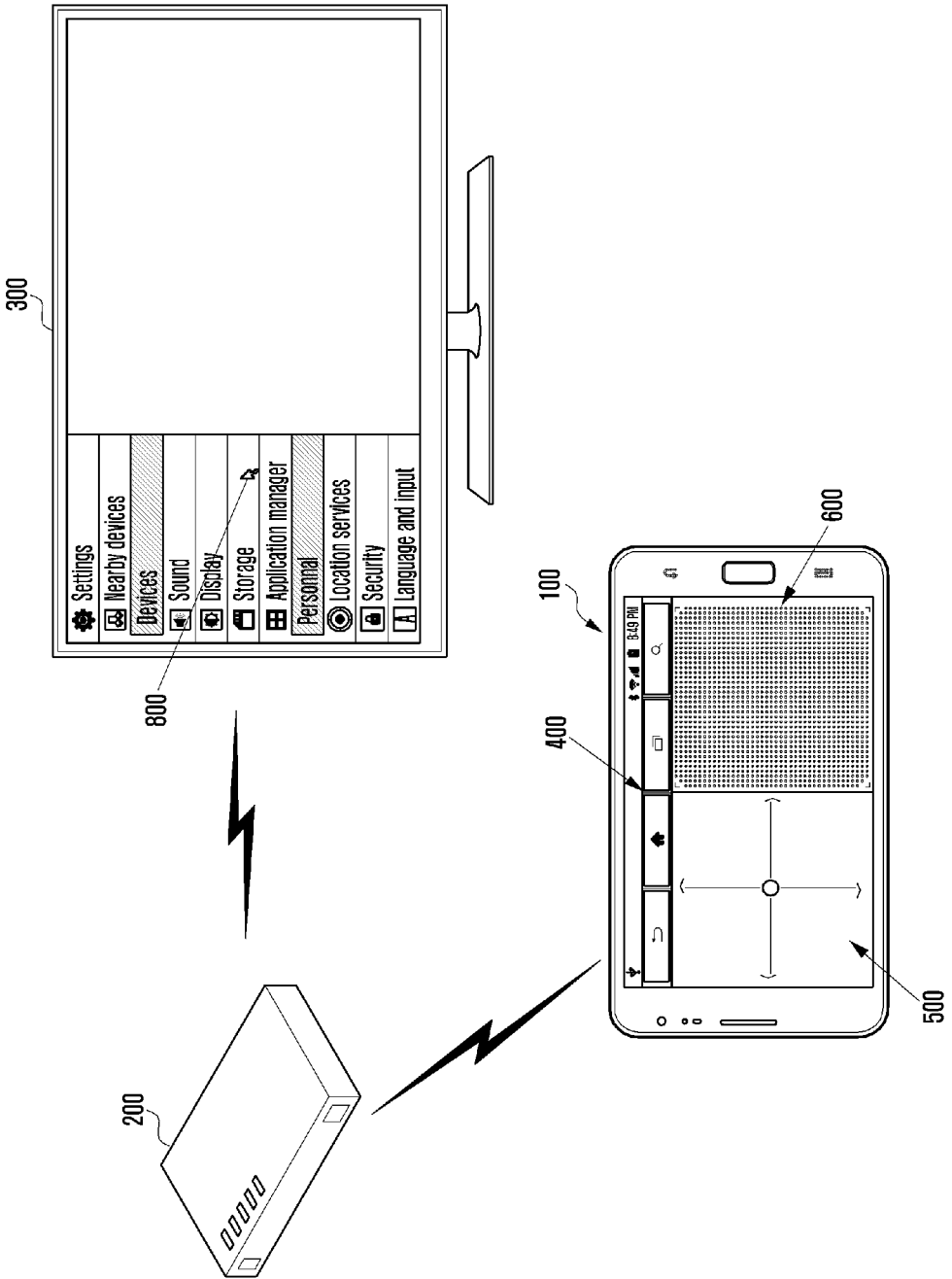
FIG. 9 illustrates an operation of a panning function in a system according to an embodiment of the present invention.
Figure 10:
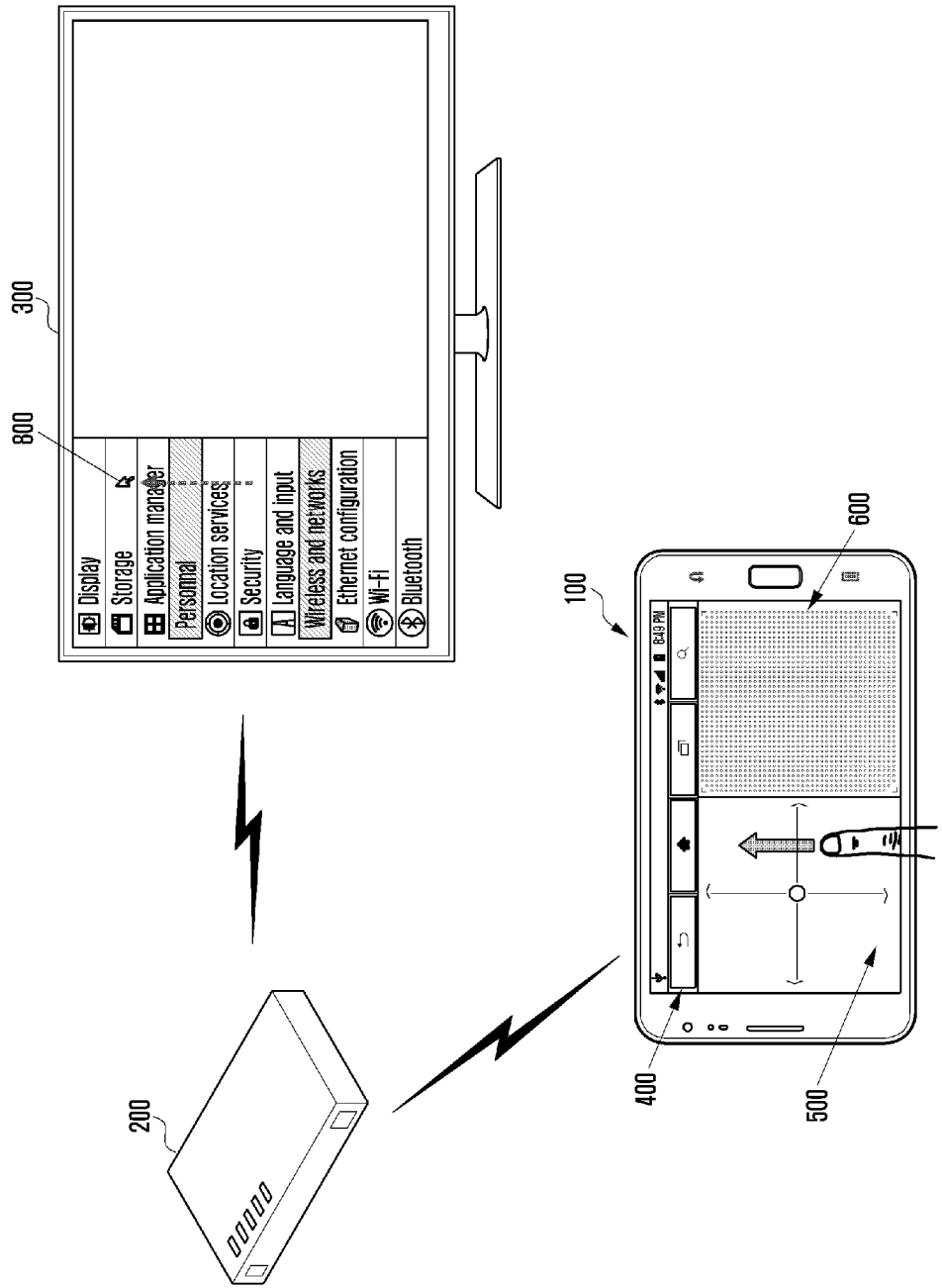
FIG. 10 shows a state where user inputs a mouse gesture (touch down and touch move) for panning the screen of contents displayed in the display device by a user.
Figure 11:
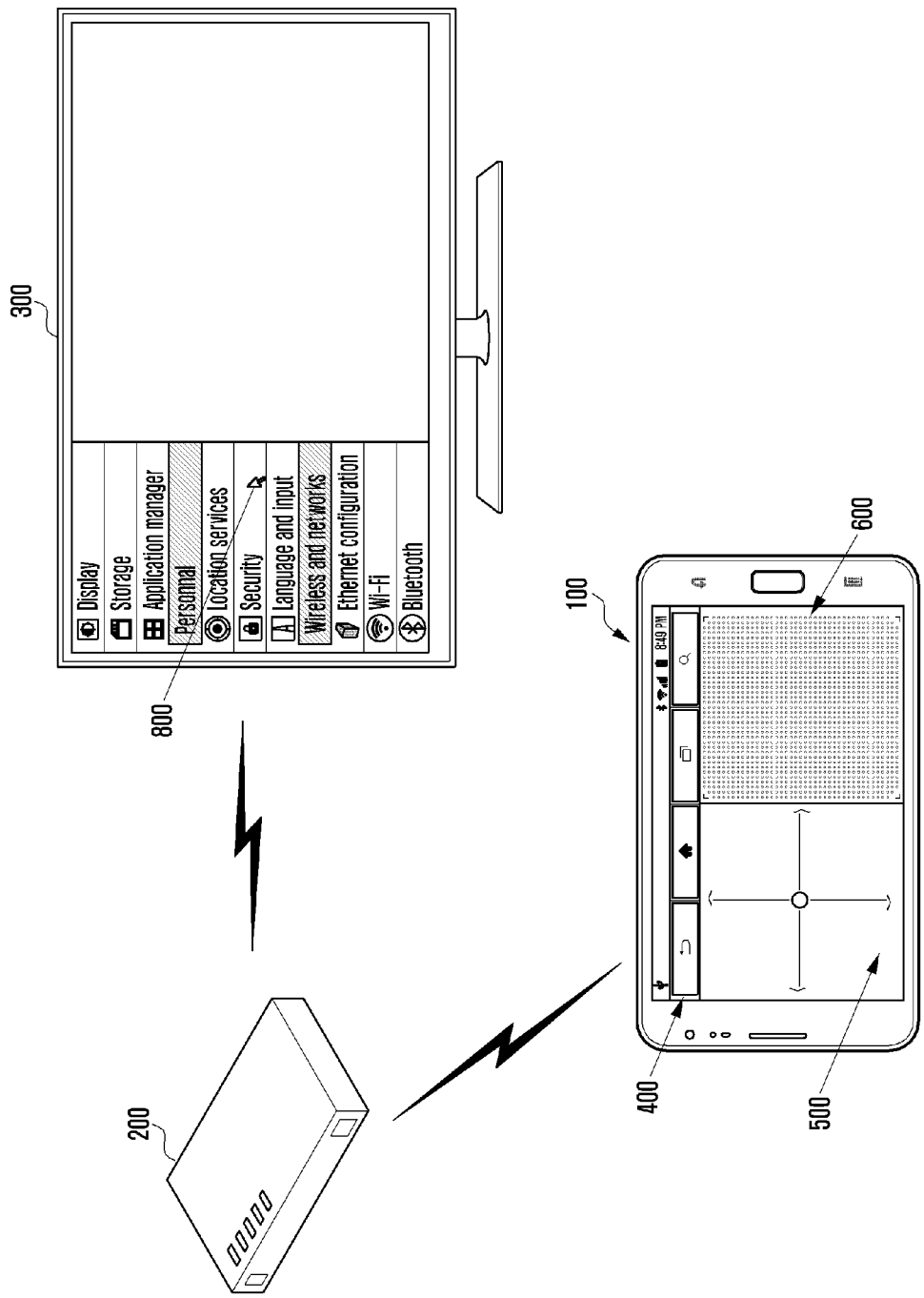
FIG. 11 illustrates a case where the user completes panning in the state of FIG. 9.

FIGS. 9, 10 and 11 illustrate an operation of a panning function in a system according to an exemplary embodiment of the present invention. In particular, FIGS. 9, 10 and 11 illustrate a case where panning control mode by a pointer return is operated.

Referring to FIGS. 9, 10 and 11, FIG. 9 shows an example of a state where the slave device 200 is connected to the display device 300 via a wired interface (e.g., HDMI), and the screen of contents of the slave device 200 is displayed through the display device 300. Further, a screen example of a state where the master device 100 is connected to the slave device 200 through a wireless interface (e.g., Wi-Fi), and the mouse interface, of which the screen is divided into the panning area 500 and the pointer move area 600, is being displayed in the master device 100 is shown.

In the state illustrated in FIG. 9, user may input operation of executing a particular shortcut function through the function button area 400, input panning operation of panning the screen of contents through the panning area 500, and may input the operation of moving the pointer 800 through the pointer move area 600 in the mouse interface of the master device 100. In this disclosure, the panning operation includes an operation of moving the screen of contents, and the right/left screen conversion (scroll, navigation), the up/down scroll, or right and left scroll may be further performed depending on the form of the mouse gesture and the type of contents which are input through the panning area 500.

FIG. 10 shows a state where user inputs a mouse gesture (touch down and touch move) for panning the screen of contents displayed in the display device 300 by user, and a state where the screen of contents displayed in the display device 300 is being panned according to the mouse gesture. As illustrated in FIG. 10, if the user's mouse gesture (touch down, touch move) is inputted through the panning area 500 in the mouse interface of the master device 100, the screen of contents is panned along with the movement of the mouse pointer 800 displayed in the display device 300.

FIG. 11 illustrates a case where the user completes panning in the state of FIG. 9. More particularly, FIG. 11 illustrates a case of the mouse interface (in particular, a release (touch up) of the mouse gesture inputted in the panning area 500) by user. As illustrated in FIG. 11, when the touch which is inputted in the panning area 500 is touched up in the mouse interface of the master device 100, the mouse pointer which is moved as in FIG. 9 may be automatically returned to the position of the time point when the touch down is inputted as in FIG. 9. At this time, the panning state of the screen is maintained as in the screen example of the display device of FIG. 11.

Figure 12:
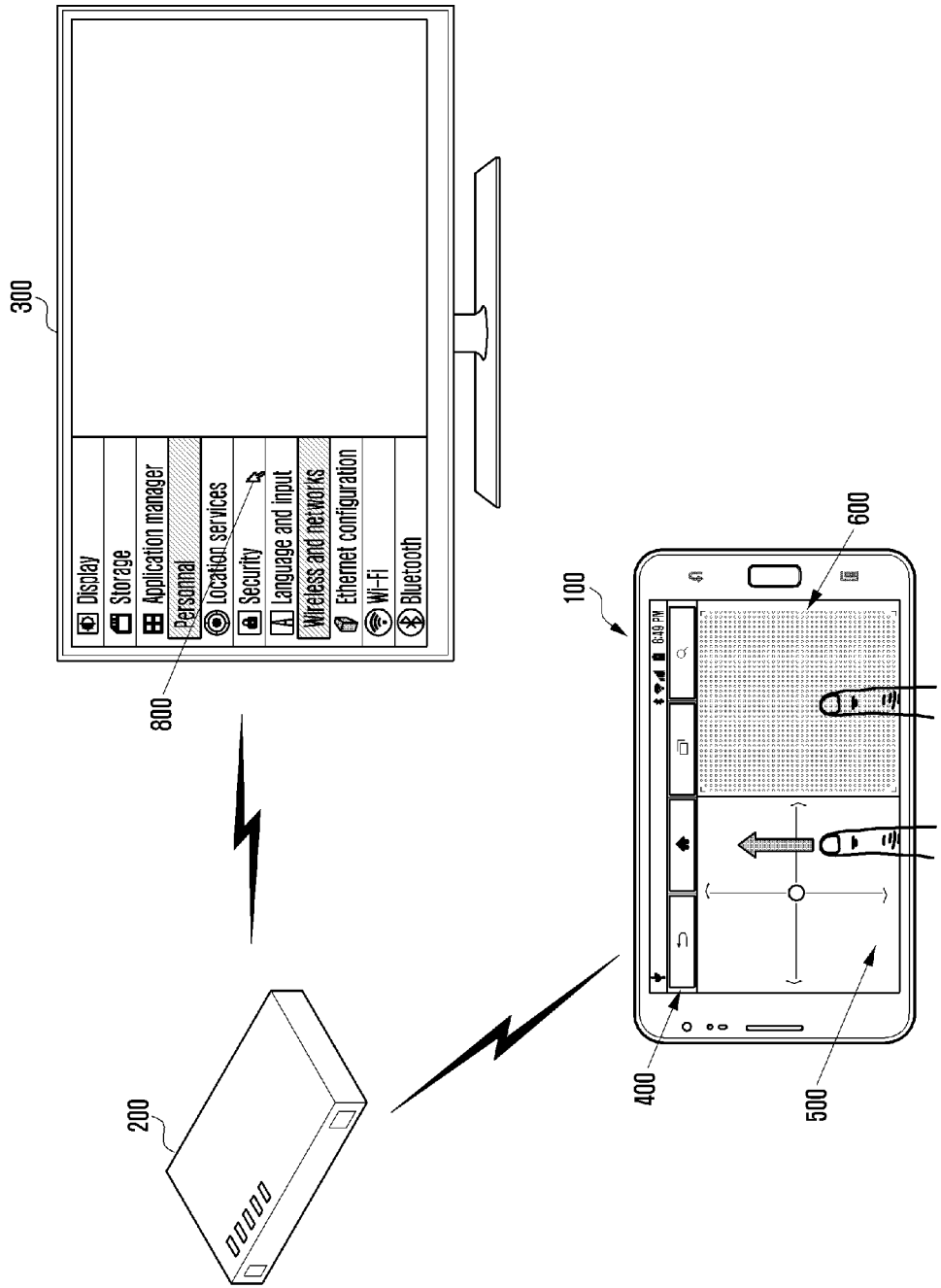
FIG. 12 illustrates a panning function operation according to an embodiment of the present invention where the panning control mode is operated by the pointer fixing.

FIG. 12 illustrates a panning function operation according to an exemplary embodiment of the present invention. In particular, FIG. 12 illustrates a case where the panning control mode is operated by the pointer fixing.

Referring now to FIGS. 9 and 12, FIG. 12 illustrates a state where user inputs a mouse gesture (touch down, touch move) for panning the screen of contents displayed in the display device 300, and a state where the screen of the contents displayed in the display device 300 is being panned in the state of FIG. 9.

As illustrated in FIG. 9 and FIG. 12, there is illustrated in FIG. 12 a state where a user's touch is inputted to both the panning area 500 and the pointer move area 600, respectively, at the time of panning control, and a state of panning only the contents of the screen without moving the mouse pointer 800. More particularly, if the user's mouse gesture is inputted through the panning area in the state where the user's touch is being pressed through the pointer move area 600 in the mouse interface of the master device 100, the mouse pointer 800 displayed in the display device 300 is not moved according to the mouse gesture of the panning area 500, and only the screen of contents is panned, which may correspond to the operation of scrolling using the wheel of the mouse. Further, the panning operation by the pointer fixing as in FIG. 12 may also be operated when a first touch is inputted first in the panning area 500 and then another touch is inputted together in the pointer move area 600.

Further, whereas conventionally, the mouse pointer 800 is moved together at the time of panning, and thus in order to perform consecutive panning operations in a long list, etc., the mouse may need to be moved to the intermediate point after panning, and then another panning may need to be performed, which may be inconvenient to user. Hence, the exemplary embodiments of this disclosure can provide a scheme of automatically returning the mouse pointer 800 to a touched-down position at the time of completion of panning by a touch-up, and a scheme of panning only the screen of contents in a state where position of the mouse pointer 800 is fixed by panning using the panning area 500 in a state where the pointer move area 600 is touched.

Hereinafter, the method of returning the mouse pointer 800 at the time of panning, i.e., the method of operating the panning control mode by the pointer return, and method of fixing the mouse pointer 800 at the time of panning, i.e., the method of operating panning control mode by the pointer fixing, will be described in more detail. At this time, the panning control mode of this disclosure may be performed in the master device 100 and the slave device 200, which will be described below, respectively.

First, the method of operating the panning control mode by the pointer return and operating the panning control mode by the pointer fixing in the master device 100 will be described with reference to FIGS. 13 and 14.

Figure 13:
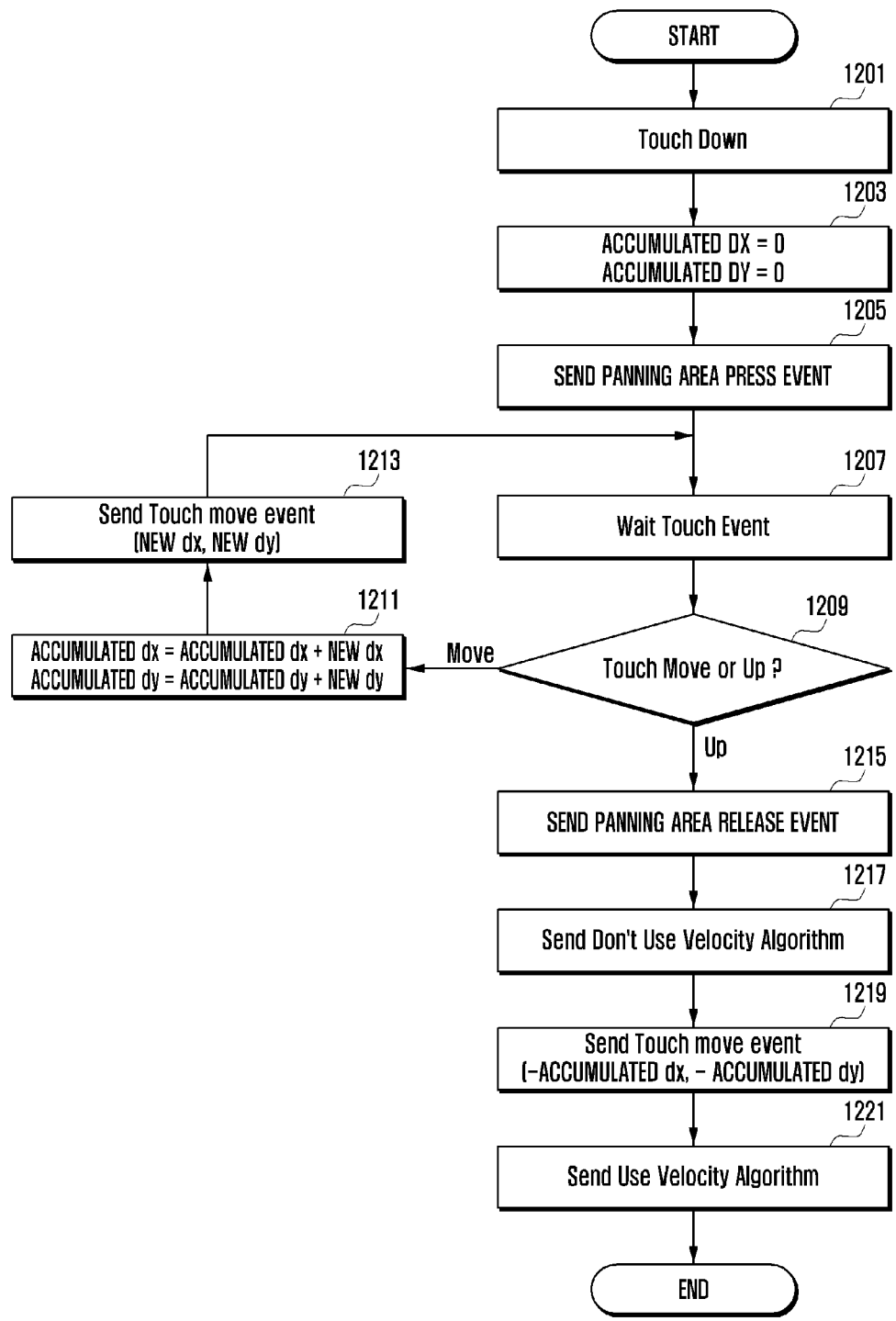
FIG. 13 is a flowchart illustrating a method of operating a panning control mode in a master device according to an exemplary embodiment of the present invention.

FIG. 13 is a flowchart illustrating a method of operating a panning control mode in a master device 100 according to an exemplary embodiment of the present invention. In particular, FIG. 13 illustrates an operation of operating the panning control mode by the pointer return in the master device 100.

Referring now to FIG. 13, at operation 1201, if the touch down is inputted through the panning area 500 of the mouse interface, then at operation 1203 the controller 170 of the mater device 100 generates accumulated coordinates (dx, dy) from the coordinates where the touch down has been inputted. Here, the accumulated coordinates may be dx=0, dy=0 according to the touch down. Further, the controller 170 generates a touch event (e.g., a touch press) according to the touch down of the panning area 500, and at operation 1205 transmits the generated touch event to the slave device 200.

At operation 1207, the controller 170 waits for the next touch event (e.g., a touch move, touch up) input after generation of the touch event. If the next touch event is inputted, at operation 1209 the controller 170 determines whether the touch event corresponds to a touch move or a touch up.

If at operation 1209, the next touch event corresponds to the touch move ("Move" of operation 1209), then at operation 1211 the controller 170 calculates the accumulated coordinates (dx, dy) from the movement according to the touch move. For example, the controller 170 may update accumulated coordinates (dx, dy) by combining the accumulated coordinates (dx, dy) generated from the touch down with the coordinates (dx, dy) which is moved according to the touch move, that is, by combining the unit movement distance in x-direction with the unit movement distance in y-direction. The accumulated coordinates may be continually accumulated based on touch events according to the touch move. That is, the accumulated coordinates (accumulated dx=accumulated dx+new dx, accumulated dy=accumulated dy+new dy) may be generated according to the touch move. Further, the controller 170 generates a touch event according to the touch gesture and at operation 1213 transmits the generated touch event to the slave device 200. Thereafter, the controller 170 performs operation 1207 to control the above operation until the touch up is inputted.

If at operation 1209, the next touch event corresponds to the touch up ("Up" of operation 1209), the controller 170 generates a touch event (e.g., a touch release) according to the touch up, and at operation 1215 transmits the generated touch event to the slave device 200. At this time, when the touch up is detected, at operation 1217 the velocity algorithm is deactivated, in other words, is not applied to the movement of the mouse pointer 800.

Here, generally, velocity refers to the amount of how quickly one point is moved in a certain direction. Further, generally, when the mouse pointer 800 is moved, the velocity V is applied according to the moved distance S and the generated time T, and when the velocity is greater than a predetermined value by short time movement of a long distance, a scale value greater than 1 is proposed to be multiplied so that the mouse pointer 800 moved further than the actual movement. In contrast, the velocity is smaller than a predetermined value by long time movement of a short distance, a scale value smaller than 1 is proposed to be multiplied so that the mouse pointer 800 may be moved by a distance less than the actual distance. However, in order to return the mouse pointer 800 to the original position at the panning operation, such a velocity algorithm should not be applied. Hence, in the present embodiment, the velocity algorithm is set temporarily so as not to be applied at the panning control mode by the pointer 800 return.

At operation 1219, the controller 170 generates a touch event (e.g., a reverse touch move) for moving the pointer 800, which is moved according to the touch move, to the initial position where the touch down has been inputted, and transmits the generated touch event to the slave device 200. For example, the controller 170 may generate the deducted accumulated coordinates (−dx, −dy) corresponding to the accumulated coordinates (dx, dy) which are acquired in the above operation 1211, and may transmit the touch event according thereto to the slave device 200. As such, the mouse pointer 800 moved according to the panning operation may move in reverse to return to the original position.

When the return of the pointer 800 according to the touch up is completed, at operation 1221 the controller 170 may reactivate the temporarily stopped velocity algorithm.

Figure 14:
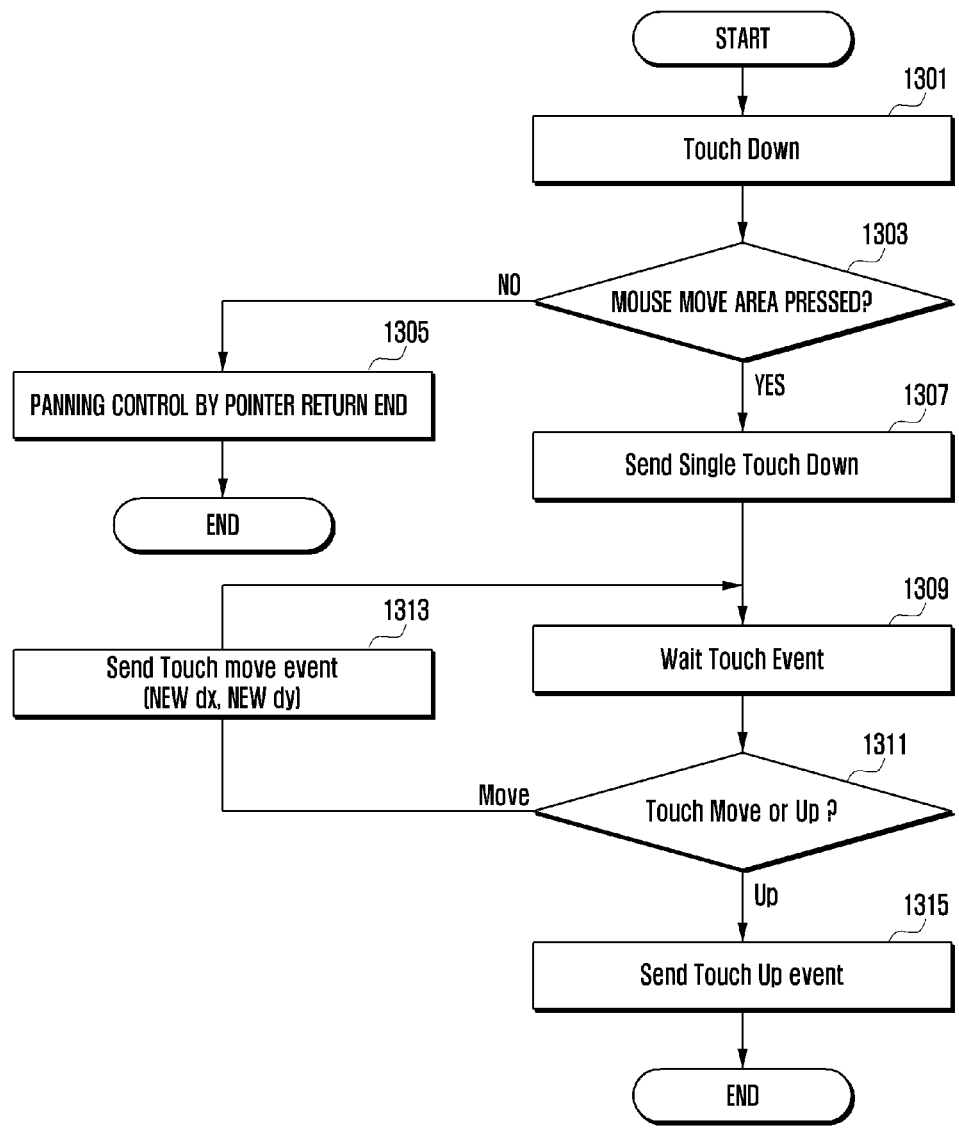
FIG. 14 is a flowchart illustrating a method of operating a panning control mode in a master device according to an exemplary embodiment of the present invention.

FIG. 14 is a flowchart illustrating a method of operating a panning control mode in a master device 100 according to an exemplary embodiment of the present invention. In particular, FIG. 14 illustrates an operation of operating panning control mode by pointer fixing in the master device 100.

Referring now to FIG. 14, at operation 1301, if the touch down is inputted through the panning area 500 of the mouse interface, then at operation 1303 the controller 170 of the master device 100 determines whether another touch is being pressed in the pointer move area 600.

If at operation 1303, there is no other touch input which is being pressed in the pointer move area 600 (No of operation 1303), then at operation 1305 the controller 170 controls panning operation by the pointer return. In other words, the controller 170 controls panning control mode as described with reference to FIG. 12.

If at operation 1303, there is another touch input which is being pressed in the pointer move area 600 (Yes of operation 1303), the controller 170 generates a single touch event according to the single touch down and at operation 1307 transmits the generated touch event to the slave device 200. More particularly, when a touch down is detected through the panning area 500 in a state where a particular input is maintained in the pointer move area 600, the controller 170 may determine the panning operation by the pointer fixing and generate a touch event according to the panning operation. Thus, the controller 170 may omit the touch event corresponding to the pointer move area 600, and generate a touch event for only the panning of the contents screen corresponding to the panning area.

At operation 1309, the controller 170 waits for an input of the next touch event (e.g., a touch move, a touch up) after generation of the above touch event. Further, if the next touch event is inputted, then at operation 1311, the controller 170 determines whether the touch event corresponds to the touch move or the touch up.

If at operation 1311, the touch event corresponds to the touch move ("Move" of operation 1311), the controller 170 generates a touch event according to the touch move and transmits the generated touch event to the slave device 200. At this time, the controller 170 may generate the coordinates moved according to the touch move and transmit the touch event according thereto to the slave device 200. For example, when a touch move is inputted, the controller 170 may fix the moved coordinates of the mouse pointer 800 according to the touch move of the panning area 500 when a touch move is inputted, and generate a touch event for the contents screen panning by the coordinates which are moved according to the touch move. As such, the position of the mouse pointer 800 may be fixed at the panning operation, and only the panning of the screen of the contents may be performed according to the touch move. Thereafter, the controller 170 controls operation until a touch up is inputted by proceeding to operation 1309 to wait for a touch event.

If at operation 1311, the next touch event corresponds to a touch up ("Up" of operation 1311), then at operation 1315 the controller 170 generates a touch event (e.g., a touch release) according to the touch up, and transmits the generated touch event to the slave device 200.

Next, a non-limiting example of the method of operating the panning control mode by the pointer return and the panning control mode by the pointer fixing in the slave device 200 will be described below with reference to FIGS. 15 and 16.

Figure 15:
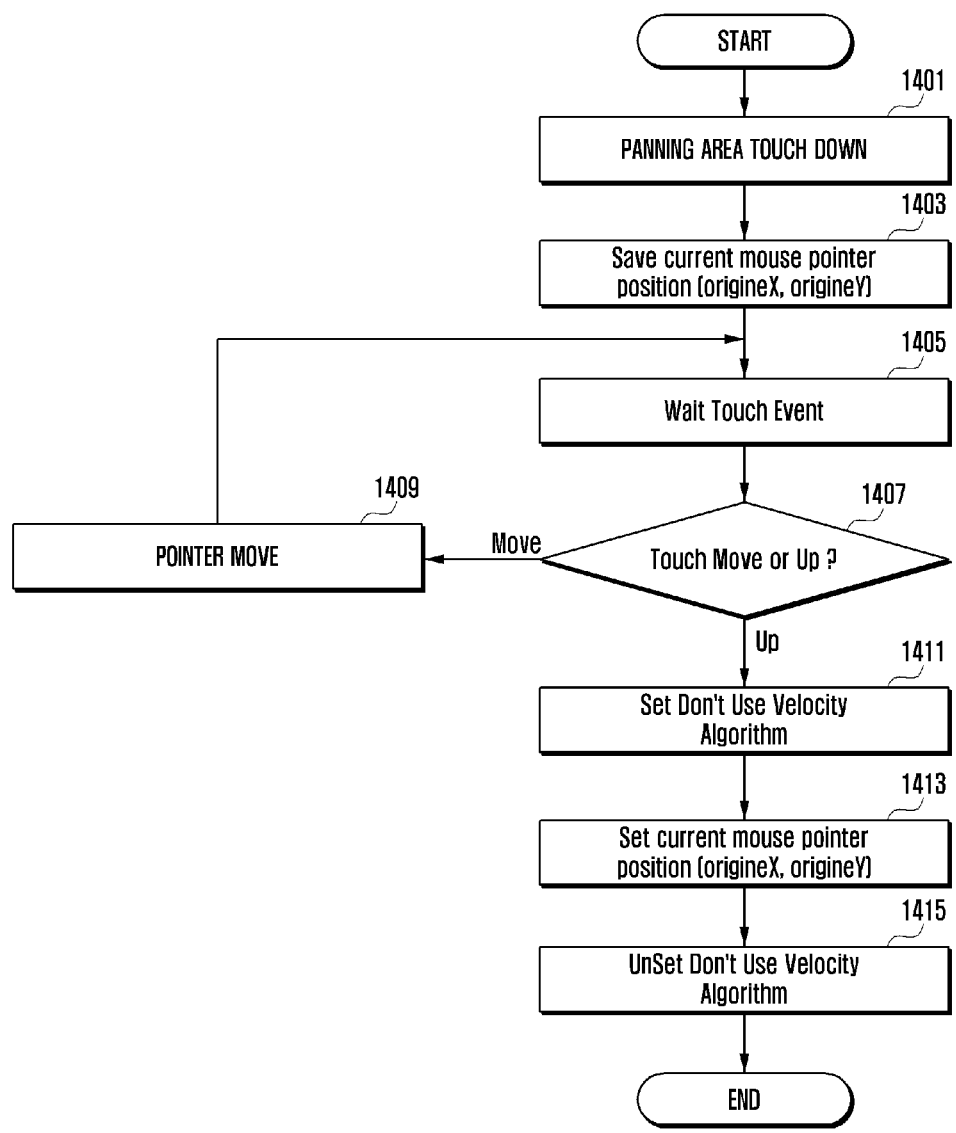
FIG. 15 is a flowchart illustrating a method of operating a panning control mode in a slave device according to an exemplary embodiment of the present invention.

FIG. 15 is a flowchart illustrating a method of operating a panning control mode in a slave device 200 according to an exemplary embodiment of the present invention. In particular, FIG. 15 illustrates an operation of operating the panning control mode by a pointer return in the slave device 200.

Referring now to FIG. 15, at operation 1401, the controller 270 of the slave device 200 may receive a touch event according to the touch down of the panning area 500 from the master device 100. At operation 1403, the controller 270 stores the current position of the mouse pointer 800 based on the touch event. For example, the controller 270 may store the current coordinates of the mouse pointer 800 as origin coordinates (origin x, origin y) in response to the generation of the touch event of the master device 100.

After receiving the touch event, the controller 270 waits for the next touch event at operation 1405.

Further, if the next touch event is received from the master device 100, at operation 1407 the controller 270 determines whether the next touch event corresponds to the touch move.

If at operation 1407, the touch event corresponds to the touch move ("Move" of operation 1407), then at operation 1409 the controller 270 moves the mouse pointer 800 in response to the touch move. Thereafter, the controller 270 controls the above operation until a touch up is inputted by proceeding to perform operation 1405.

If at operation 1407, the next touch event corresponds to a touch up ("Up" of operation 1407), then at operation 1411 the controller 270 deactivates the velocity algorithm, in other words, the controller 270 does not apply the velocity algorithm to the movement of the mouse pointer 800. Further, at operation 1413, the controller 270 moves the pointer 800 to the position of the origin coordinates in response to the touch up. More particularly, the controller 270 sets the move coordinates to which the pointer 800 moved according to the touch move is to be moved, as origin coordinates, and moves the pointer 800 to the position according to the origin coordinates to return to the original position.

When the return of the pointer 800 according to the touch up is completed, at operation 1415 the controller 270 reactivates the temporarily stopped velocity algorithm.

Figure 16:
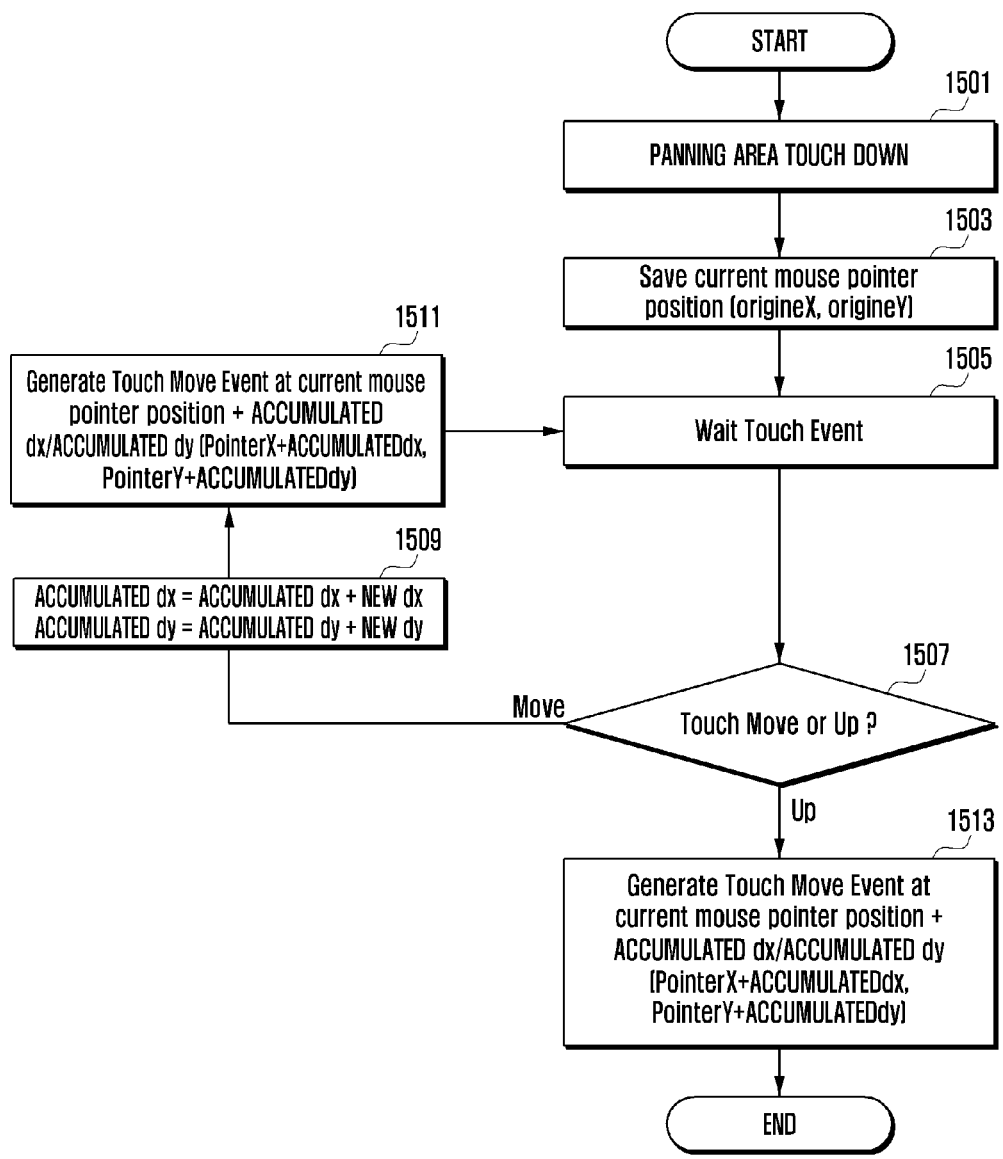
FIG. 16 is a flowchart illustrating a method of operating a panning control mode in a slave device according to an exemplary embodiment of the present invention.

FIG. 16 is a flowchart illustrating a non-limiting example of a method of operating a panning control mode in a slave device 200 according to an embodiment of the present invention. In particular, FIG. 16 illustrates an operation of panning control mode by pointer fixing in the slave device 200.

Referring now to FIG. 16, at operation 1501, the controller 270 of the slave device 200 may receive a touch event according to a touch down of the panning area 500 from the master device 100. In particular, as a state where another touch which is being pressed in the pointer move area 600 is inputted, is assumed, the controller 270 may receive a single touch event according to a single touch event of the panning area 500.

If the single touch event is received, at operation 1503 the controller 270 generates a touch down event in the current position of the mouse pointer 800 (e.g., pointer coordinates (pointer x, pointer y)). At this time, the controller 270 may fix the mouse pointer 800 in the current position of the mouse pointer 800 (e.g., the pointer coordinates).

After generating the touch down event in the pointer coordinates, the controller 270 waits for the next touch event at operation 1505. Further, if the next touch event is received from the master device 100, at operation 1507 the controller 270 determines whether the next touch event corresponds to the touch move or the touch up.

If the next touch event corresponds to the touch move ("Move" of operation 1507), at operation 1509 the controller 270 calculates the accumulated coordinates (dx, dy) from the movement according to the touch move. For example, the controller 170 may update the accumulated coordinates (dx, dy) by combining the pointer coordinates (pointer x, pointer y) generated from the touch down with the coordinates (new dx, new dy) moved according to the touch move, that is, by combining the unit movement distance in x-direction with the unit movement distance in y-direction. The accumulated coordinates may be continually accumulated according to the touch event corresponding to the touch move. For example, the accumulated coordinates may be accumulated dx=accumulate dx+new dx, and accumulated dy=accumulated dy+new dy according to the touch move. Further, the controller 270 generates a touch move event at the position (e.g., the position where the pointer coordinates (pointer x, pointer y) are combined with the accumulated coordinates (dx, dy) (e.g., pointer x+dx, pointer y+dy)) of the current mouse pointer 800 for the touch event according to the touch move at operation 1511. As such, the mouse pointer 800 may be fixed, and only the screen panning of the contents according to the touch move event may be performed. Thereafter, the controller 270 controls the above operation until a touch up is inputted by proceeding to perform operation 1505.

If at operation 1507 the next touch event corresponds to the touch up ("Up" of operation 1507), then at operation 1513 the controller 270 generates a touch up event at a position (e.g., the position where the pointer coordinates (pointer x, pointer y) are combined with the accumulated coordinates (dx, dy) (e.g., pointer x+dx, pointer y+dy)) of the current mouse pointer 800. As such, the mouse pointer 800 may be fixed, and a state where only the screen of the contents is panned may be provided.

Further, the screen size that is processed in the mouse interface (particularly, the panning area 500) of the master device 100 (that is, the screen size for processing the inputted touch of user) may be different from the screen size for processing panning according to a touch event (that is processed and transmitted in the master device 100) in the slave device 200 (that is, a virtual screen size of the slave device 200 (e.g., the screen size of the display device 300)). Further, in the master device 100, relative coordinates are used instead of absolute coordinates, and in the slave device 200, the absolute coordinates may be used.

More particularly, as illustrated in FIG. 16, the slave device 200 may receive a touch event by the relative coordinates from the master device 100, and convert the relative coordinates into the absolute coordinates to pan the contents screen. The conversion into the absolute coordinates indicates combining the touch event of the relative coordinates received from the master device 100 with the current position of the mouse pointer 800 and converting the result of combination into a touch event of the absolute coordinates. Here, the slave device 200 may convert the relative coordinates into the absolute coordinates in consideration of the ratio of the resolution of the master device 100 to resolution of the slave device 200. For example, the slave device 200 may reflect a particular ratio of the resolution of the master device 100 to the resolution of the slave device 200 in the calculation of the absolute coordinates (e.g., calculation of the absolute coordinates by multiplying a particular ratio).

For example, in the case of a touch event according to the touch down, a particular point of the panning area 500 may be touched in the master device and a touch event that informs of the start of the mouse operation (e.g., panning) may be generated, and the touch event of the relative coordinates may be transmitted to the slave device 200. Then, the slave device 200 may convert the relative coordinates according to the touch event to the absolute coordinates, and the input of the touch down on the converted absolute coordinates may be processed.

Further, in the case of a touch event according to the touch move, the touch inputted at a particular point of the panning area 500 may be moved to another point in the master device 100, and a touch event of the relative coordinates that informs of the progress of the mouse operation (e.g., panning) may be generated, and the touch event of the relative coordinates may be transmitted to the slave device 200. Then, the slave device 200 may convert the relative coordinates according to the touch event to the absolute coordinates, and the input of the touch move based on the converted absolute coordinates may be processed. For example, if a touch move, which is moved from the touched-down coordinates (e.g., 300, 400) to (310, 395), is detected through the panning area, the master device 100 generates a touch event of the relative coordinates which moves the mouse point from the current coordinates of the mouse pointer by +10 in x-axis and by −5 in y-axis. The slave device 200 converts the touch event of relative coordinates, which moves the mouse pointer from the current coordinates of the mouse pointer (e.g., 500, 1000) by +10 in x-axis and by −5 in y-axis in response to the touch event of the relative coordinates, into the absolute coordinates such as (510, 995), and generates a touch event of the absolute coordinates, which moves the mouse pointer to the converted coordinates (510, 995).

In the case of a touch event according to the touch up, a touch event of relative coordinates, which informs of termination of the mouse operation (e.g., panning) by a release of a touch which is inputted at a particular point of the panning area 500, may be generated, and the touch event of the relative coordinates may be transmitted to the slave device 200. Then, the slave device 200 may convert the relative coordinates according to the touch event into the absolute coordinates, and the input of the touch up to the converted absolute coordinates may be processed.

Likewise, when the slave device 200 fixes the mouse pointer 800 and pans only the contents screen (background), the slave device 200 may receive the touch event of the relative coordinates from the master device 100, convert the received touch event into the touch event of the absolute coordinates in combination with the position of the current mouse pointer, and process panning by the converted touch event. The foregoing exemplary embodiments of the present invention may be implemented in an executable program command form by hardware comprising various computer configurations and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer processor, microprocessor, controller or other circuitry using an interpreter. The foregoing hardware device may be configured to be operated as at least one software module to perform an operation of the present invention, and vice versa. Any of the functions and steps provided in the Figures may be implemented in hardware, software in conjunction with hardware or a combination of both and may be performed in whole or in part within the programmed instructions of a computer. No claim element herein is to be construed under the provisions of 35 U.S.C. 112, sixth paragraph, unless the element is expressly recited using the phrase "means for".

According to a method and apparatus for providing a mouse function using a touch device as illustrated in the present disclosure, any user may easily operate a tablet computer, a display device, a TV, etc. using a touch device such as a smart phone. According to the present disclosure, any user may easily control remote devices such as a tablet computer, a display device, and a TV, using an improved mouse function through a touch device held by user without a separate device such as a wireless mouse or a wireless keyboard.

According to the present disclosure, by screen-dividing the area for the panning operation of the screen and the move operation of the mouse pointer, intuitive usability is provided and convenience is provided in using both hands, and thus a complicated mouse operation may be easily performed. Hence, according to the present disclosure, quality of the mouse function a touch device may be improved.

Hence, according to the present disclosure, user's convenience may be improved, and usability, convenience, and competitiveness of a touch device may be improved by implementing an optimal environment for supporting a mouse function in the touch device. The present disclosure may be simply implemented to all forms of touch devices and various devices corresponding thereto.

In addition, an artisan understands and appreciates that under the broadest reasonable interpretation, a "processor", "microprocessor" or "controller" comprises circuitry in the claimed disclosure that is configured for operation by the execution of machine executable code. Under the broadest reasonable interpretation, the appended claims constitute statutory subject matter in compliance with 35 U.S.C. §101.

The definition of the terms "unit" or "module" as referred to herein is to be understood as constituting hardware circuitry such as a processor or microprocessor that may comprise an integrated circuit configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

Although exemplary embodiments of the present disclosure have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of providing a mouse function in a touch device, the method comprising:
   displaying by a display screen of the touch device a mouse interface which is divided into a panning area and a pointer move area;
   receiving an input of a mouse gesture through the mouse interface;
   processing at least one of:
   a panning operation of a contents screen which is displayed in a display device in communication with the touch device when the mouse gesture is inputted in the panning area; and a move operation of a mouse pointer which is displayed in the display device in communication with the touch device when the mouse gesture is inputted in the pointer move area, wherein, after checking a state of the pointer move area is made when the mouse gesture is detected in the panning area, control panning of the contents screen of the display device and movement of the mouse pointer are operated together if the pointer move area is not in a touch press state, while panning of the contents screen of the display device without moving the mouse pointer is operated according to the mouse gesture of the panning area if the pointer move area is in a touch press state.

2. The method of claim 1, wherein a controller of the display device processes at least one of the panning operation or the move operation input to the mouse interface of the touch device.

3. The method of claim 1, wherein the touch device operates a master device that communicates with a slave device in which the slave device processes at least one of the panning of contents displayed in the display device or the movement of a mouse pointer displayed in the display device according to a control event in the touch device.

4. The method of claim 1, wherein the displaying by the touch device comprises:
executing a mouse mode in response to a request to execute the mouse mode;
performing synchronization with a slave device including the contents; and
displaying the mouse interface which is screen-divided into the panning area and the pointer move area.

5. The method of claim 4, further comprising:
connecting the slave device with the display device via a wired interface, and displaying the contents stored in the slave device, in the display device; and
connecting the touch device with the slave device via a wireless interface, and remotely controlling the contents which are displayed in the display device.

6. The method of claim 1, wherein the processing of the panning operation comprises:
receiving by the mouse interface a touch down input through the panning area;
activating a panning control mode;
receiving a touch move input in the panning area;
generating a control event that is communicated to the display device displaying the content to pan the contents screen in the display device in response to the touch move;
receiving by the mouse interface a touch up input in the panning area; and
terminating the panning control mode in response to the touch up.

7. The method of claim 6, wherein the processing of the panning operation comprises:
determining a state of the pointer move area when the touch down is inputted in the panning area; and
generating a control event for panning of the contents screen in the display device and movement of the mouse pointer in response to the touch move in response to the determining that the pointer move area is not in a touch press state.

8. The method of claim 6, wherein the terminating of the panning control mode comprises:
returning the mouse pointer in response to the touch up.

9. The method of claim 8, wherein the returning the mouse pointer comprises:

checking first coordinates at which the touch down is inputted;
accumulating second coordinates from the movement according to the touch move based on the first coordinates, when the touch move is inputted;
calculating third coordinates corresponding to the accumulated second coordinates, when the touch up is inputted; and
moving and returning the mouse pointer corresponding to the third coordinates.

10. The method of claim 9, further comprises:
omitting application of a velocity algorithm to movement of the mouse pointer when the touch up is inputted.

11. The method of claim 8, wherein the returning the mouse pointer comprises:
receiving, by a slave device, a touch down event according to a touch down of a panning area from the touch device;
storing a current position of the mouse pointer in response to the touch down event;
receiving a touch move event according to a touch move of the panning area from the touch device;
panning the contents screen of the display device and moving the mouse pointer in response to the touch move event;
receiving a touch up event according to a touch up of the panning area from the touch device; and
moving and returning the mouse pointer to the stored position in response to the touch up event.

12. The method of claim 11, wherein application of a velocity algorithm to the movement of the mouse pointer is omitted when receiving the touch up event.

13. The method of claim 6, wherein the processing of the panning operation comprises:
generating a control event for fixing display of the mouse pointer and panning the contents screen of the display device while the mouse pointer does not move in response to the touch move if the pointer move area of the mouse interface is in a touch press state.

14. The method of claim 13, wherein the fixing of the mouse pointer and the panning of the contents screen comprise:
generating a touch event according to a touch down of the panning area of the mouse interface when a touch is inputted in the panning area and the pointer move area of the touch device; and
generating a touch event for fixing coordinates of the mouse pointer to which a pointer is to be moved according to the touch move of the panning area, as origin coordinates, and panning the contents screen according to the coordinates moved according to the touch move when the touch move is inputted.

15. The method of claim 13, wherein the fixing of the mouse pointer and the panning of the contents screen comprise:
receiving, by a slave device, a touch down event according to the touch down of the panning area from the touch device;
fixing display of the mouse pointer at a current position of the mouse pointer in response to the touch down event;
receiving a touch move event according to the touch move of the panning area from the touch device; and
omitting movement of the mouse pointer on the contents screen of the display device and panning the contents screen in response to the touch move event.

16. The method of claim 15, wherein the panning comprises:

generating pointer coordinates based on a current position of the mouse pointer from the touch down event;

calculating accumulated coordinates by combining the pointer coordinates with new coordinates which are moved according to the touch move event; and fixing display of the mouse pointer at the pointer coordinates and panning the contents screen according to the accumulated coordinates in response to the touch move event without moving the mouse pointer.

17. The method of claim 16, wherein the panning comprises:

receiving, by the slave device, a touch event of relative coordinates from the touch device, converting the received touch event into a touch event of the absolute coordinates by combining the touch event with the current position of the mouse pointer, and performing panning by the converted touch event.

18. A touch device comprising:

a display unit including a touch screen configured to display a mouse interface which is divided into a panning area for palming of a contents screen of a display device in communication therewith and a pointer move area for movement of a mouse pointer at a mouse mode;

a controller configured to control a display of the mouse interface which is divided into the palming area and the pointer move area at the time of execution of the mouse mode;

a touch sensing unit configured to sense a touch event comprising a user control event from at least one of the panning area or the pointer move area of the mouse interface;

a wireless communication unit configured to be controlled by the controller to transmit the touch event generated from the mouse interface;

wherein the controller is configured to generate a control event for panning the contents screen or moving the mouse pointer according to a mouse gesture which is inputted from the panning area or the pointer move area, respectively, and wherein the controller is configured to check a state of the pointer move area when the mouse gesture is detected in the panning area, control panning of the contents screen of the display device and movement of the mouse pointer together if the pointer move area is not in a touch press state, and control panning of the contents screen of the display device without moving the mouse pointer according to the mouse gesture of the panning area if the pointer move area is in a touch press state.

19. The touch device of claim 18, wherein the controller is configured to, when the pointer move area is not in the touch press state, pan the contents screen of the display device and move the mouse pointer together according to the mouse gesture, and then move and return the moved mouse pointer to the original position before movement when the mouse gesture is released.

20. A remote control system using a mouse function, the remote control system comprising:

a master device configured to display a mouse interface which is screen-divided into a panning area and a pointer move area when a mouse mode is executed, and generate a control event for panning of a contents screen and movement of a mouse pointer according to a mouse gesture which is inputted from the panning area and the pointer move area;

a slave device configured to provide contents, and process panning of a contents screen and movement of the mouse pointer according to the control event of the master device; and a display device configured to display the contents screen related with the contents of the slave device, wherein the slave device receives relative touch coordinates from the master device, and the slave device converts the relative coordinates into absolute coordinates slave device that are transmitted to the display device.

21. The remote control system of claim 20, wherein the slave device is configured to be connected with the display device through a wired or wireless interface, and is configured to display contents stored in the slave device in the display device, and wherein the master device is configured to be connected with the slave device through a wireless interface and is configured to remotely control contents displayed in the display device.

22. A computer-readable non-transitory recording medium having recorded thereon machine executable code that when executed by a processor configures an electronic device for displaying a mouse interface on a touch screen which is divided into a palming area for palming of a contents screen and a pointer move area for movement of a mouse pointer in a mouse mode, and generating a control event for panning a contents screen of a display device or moving the mouse pointer according to a mouse gesture which is inputted from the palming area or the pointer move area, respectively, and wherein the machine executable code, when executed, further configures the processor of the electronic device to determine whether or not the pointer area is in a touch press state to control panning of the contents screen of the display device and movement of the mouse pointer together if the pointer move area is not in a touch press state, and controls panning of the contents screen of the display device without moving the mouse pointer according to the mouse gesture of the panning area if the pointer move area is in a touch press state.

* * * * *

UNITED STATES PATENT AND TRADEMARK OFFICE
CERTIFICATE OF CORRECTION

| | |
|---|---|
| PATENT NO. | : 9,223,414 B2 |
| APPLICATION NO. | : 14/149093 |
| DATED | : December 29, 2015 |
| INVENTOR(S) | : Seoghee Jeong et al. |

Page 1 of 1

It is certified that error appears in the above-identified patent and that said Letters Patent is hereby corrected as shown below:

In the claims

Column 28, Claim 22, Line 36 should read as follows:
--...into a panning area...--

Column 28, Claim 22, Line 36 should read as follows:
--...for panning of a...--

Column 28, Claim 22, Line 41 should read as follows:
--...the panning area or...--

Signed and Sealed this
Twenty-third Day of February, 2016

Michelle K. Lee
*Director of the United States Patent and Trademark Office*